US012528171B2

(12) United States Patent
Machida et al.

(10) Patent No.: US 12,528,171 B2
(45) Date of Patent: Jan. 20, 2026

(54) HAMMER DRILL

(71) Applicant: MAKITA CORPORATION, Anjo (JP)

(72) Inventors: Yoshitaka Machida, Anjo (JP); Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/533,310

(22) Filed: Dec. 8, 2023

(65) Prior Publication Data

US 2024/0100675 A1 Mar. 28, 2024

Related U.S. Application Data

(63) Continuation of application No. 17/569,668, filed on Jan. 6, 2022, now Pat. No. 11,883,941.

(30) Foreign Application Priority Data

Feb. 15, 2021 (JP) ................................ 2021-021970
Feb. 15, 2021 (JP) ................................ 2021-021972

(51) Int. Cl.
*B25D 17/20* (2006.01)
*B25D 16/00* (2006.01)
*B25D 17/08* (2006.01)

(52) U.S. Cl.
CPC ........... *B25D 17/20* (2013.01); *B25D 16/006* (2013.01); *B25D 17/084* (2013.01);
(Continued)

(58) Field of Classification Search
CPC .... B25D 17/20; B25D 16/006; B25D 17/084; B25D 2250/121; B25D 2250/335;
(Continued)

(56) References Cited

U.S. PATENT DOCUMENTS 5,210,918 A * 5/1993 Wozniak .................. B25D 9/14 173/91
6,223,833 B1 * 5/2001 Thurler ................ B25D 11/106 173/205
(Continued)

FOREIGN PATENT DOCUMENTS

CN 204912847 U * 12/2015 ........... B25D 11/062
JP 2020-104238 A 7/2020

*Primary Examiner* — Thomas M Wittenschlaeger
*Assistant Examiner* — Katie L Gerth
(74) *Attorney, Agent, or Firm* — Oliff PLC

(57) ABSTRACT

A hammer drill includes a housing inside which a motor, a tubular tool holder, a driving mechanism, a rotation conversion member, and an inner housing are disposed. The driving mechanism is configured to perform at least one of rotation actuation of the tool holder and hammering actuation of a bit. The inner housing supports the driving mechanism, supports the tool holder via a first bearing, and supports an output shaft via a second bearing. The inner housing is divided into a front housing holding the first bearing and a rear housing that is formed in a separate body from the front housing and holds the second bearing. The inner housing is formed by connecting the front housing to the rear housing in an axis line direction of the tool holder. A seal member sealing outside space of the inner housing inside the housing is disposed in the front housing.

14 Claims, 15 Drawing Sheets

(52) U.S. Cl.
CPC .. *B25D 2250/121* (2013.01); *B25D 2250/335* (2013.01); *B25D 2250/365* (2013.01)

(58) Field of Classification Search
CPC ........ B25D 2250/365; B25D 2211/006; B25D 2211/061; B25D 2250/331; B25D 11/00; B25D 17/00
See application file for complete search history.

(56) References Cited

U.S. PATENT DOCUMENTS

| | | | | |
|---|---|---|---|---|
| 6,325,157 | B1 * | 12/2001 | Arakawa | B25D 16/00 173/171 |
| 9,505,118 | B2 * | 11/2016 | Furusawa | B25D 17/24 |
| 11,691,262 | B2 * | 7/2023 | Numata | B25F 5/026 173/217 |
| 11,738,441 | B2 * | 8/2023 | Kusumoto | H02K 5/225 173/217 |
| 2004/0084981 | A1 * | 5/2004 | Ortt | H02K 5/148 310/400 |
| 2004/0163831 | A1 * | 8/2004 | Ortt | H02K 7/145 173/217 |
| 2004/0211575 | A1 * | 10/2004 | Soika | B25D 17/00 173/217 |
| 2005/0257945 | A1 * | 11/2005 | Justis | B25F 5/02 173/217 |
| 2010/0084151 | A1 * | 4/2010 | Kuhnle | G05G 1/12 173/217 |
| 2010/0108341 | A1 * | 5/2010 | Casalena | H02J 7/0042 173/217 |
| 2011/0014857 | A1 * | 1/2011 | Bogardi | B25F 5/02 451/344 |
| 2012/0067605 | A1 * | 3/2012 | Furusawa | B25D 17/043 173/162.2 |
| 2012/0318551 | A1 * | 12/2012 | Kuhnle | B25F 5/006 173/162.2 |
| 2013/0000937 | A1 * | 1/2013 | Onoda | B25D 11/062 173/122 |
| 2014/0174777 | A1 * | 6/2014 | Kakiuchi | B25D 17/24 173/117 |
| 2014/0187321 | A1 * | 7/2014 | Morimoto | A63F 13/00 463/31 |
| 2015/0266176 | A1 * | 9/2015 | Takeuchi | B25D 17/24 173/117 |
| 2016/0151904 | A1 * | 6/2016 | Ookubo | B25D 16/00 173/128 |
| 2016/0294254 | A1 * | 10/2016 | Hara | B26D 5/14 |
| 2019/0375079 | A1 * | 12/2019 | Kamiya | B25B 21/023 |
| 2020/0177047 | A1 * | 6/2020 | Kutsuna | H02K 11/215 |
| 2020/0238483 | A1 * | 7/2020 | Kamiya | B25B 21/00 |
| 2020/0262036 | A1 * | 8/2020 | Araki | B25B 21/026 |
| 2020/0269407 | A1 * | 8/2020 | Kawai | B25D 16/00 |
| 2020/0384597 | A1 * | 12/2020 | Numata | B25F 5/026 |
| 2021/0197356 | A1 * | 7/2021 | Chung | B25F 5/008 |
| 2023/0139577 | A1 * | 5/2023 | Schlegel | B25D 16/00 173/217 |

* cited by examiner

HAMMER DRILL

RELATED APPLICATIONS

This is a Continuation of U.S. patent application Ser. No. 17/569,668, filed Jan. 6, 2022, which claims the benefit of Japanese Patent Application Numbers 2021-021970 and 2021-021972, filed on Feb. 15, 2021, the entire contents of which are incorporated herein by reference in its entirety.

BACKGROUND OF THE INVENTION

Technical Field

The disclosure relates to a hammer drill.

Related Art

A hammer drill rotatably holds, inside a housing, a tubular tool holder having a distal end on which a bit can be mounted. The tool holder includes a piston (including a piston cylinder) that reciprocates and a striker that reciprocates in conjunction with the piston by actions of an air spring. Inside the housing, the tool holder, the piston, and the striker are included, and a driving mechanism is formed to be able to give rotation actuation and/or hammering actuation to the bit.

In the driving mechanism, as disclosed in JP-A-2020-104238, an intermediate shaft parallel to a tool holder is disposed. The intermediate shaft includes a boss sleeve as a rotation conversion member that transmits the rotation of an output shaft of a motor to the tool holder and converts the rotation of the output shaft to the reciprocation of the piston. The boss sleeve includes an arm that swings back and forth with a swash bearing externally mounted such that the axis line is inclined, ant the boss sleeve is configured to connect the arm to the piston to reciprocate the piston by the swing of the arm.

Inside the housing, an inner housing that supports the driving mechanism is disposed. The inner housing includes a front plate portion that supports the rear portion of the tool holder via a bearing, a rear plate portion that supports the output shaft via a bearing, and a connecting portion that connects the front plate portion to the rear plate portion.

In the hammer drill of JP-A-2020-104238, a seal member is interposed between the outer periphery of the rear plate portion of the inner housing having a large size in a radial direction and the inner periphery at the rear portion of the housing. By the seal member, a region for housing the driving mechanism (driving mechanism housing region) is formed by partitioning the front side of the rear plate portion inside the housing. In view of this, the driving mechanism housing region and the housing have the enlarged size.

In the hammer drill of JP-A-2020-104238, a fan for motor cooling is disposed on the output shaft at the rear of the rear plate portion. However, the air that has cooled the motor is discharged to the outside of the housing from the outside of the fan in the radial direction at the rear of the rear plate portion. Accordingly, a cooling effect of the driving mechanism has not been sufficiently obtained.

Therefore, it is an object of the disclosure to provide a hammer drill with which downsizing can be achieved and a preferred cooling effect of a driving mechanism can be obtained even when a driving mechanism housing region of the hammer drill is formed by partitioning an inner housing.

SUMMARY OF THE INVENTION

In order to achieve the above-described object, a hammer drill according to the disclosure is provided. The hammer drill includes a housing inside which a motor, a tubular tool holder, a driving mechanism, a rotation conversion member, and an inner housing are disposed. The tubular tool holder has a distal end and is rotatable with a bit mounted on the distal end. The driving mechanism is configured to perform at least one of rotation actuation of the tool holder and hammering actuation of the bit. The rotation conversion member is disposed in the driving mechanism and is configured to convert rotation of an output shaft of the motor to the hammering actuation of the bit. The inner housing supports the driving mechanism, supports the tool holder via a first bearing, and supports the output shaft via a second bearing. The inner housing is divided into a front housing holding the first bearing and a rear housing that is formed in a separate body from the front housing and holds the second bearing. The inner housing is formed by connecting the front housing to the rear housing in an axis line direction of the tool holder. A seal member sealing outside space of the inner housing inside the housing is disposed in the front housing.

With the disclosure, since the inner housing is divided into front and rear parts and the seal member is disposed in the front housing, the inner housing in which the driving mechanism housing region is decreased at the rear side of the seal member can be formed. Accordingly, downsizing of a product size is also achieved. Since the cooling air of the motor can be guided to the outside of the inner housing, a preferred cooling effect of the driving mechanism can be also obtained.

DETAILED DESCRIPTION

Figure 1:
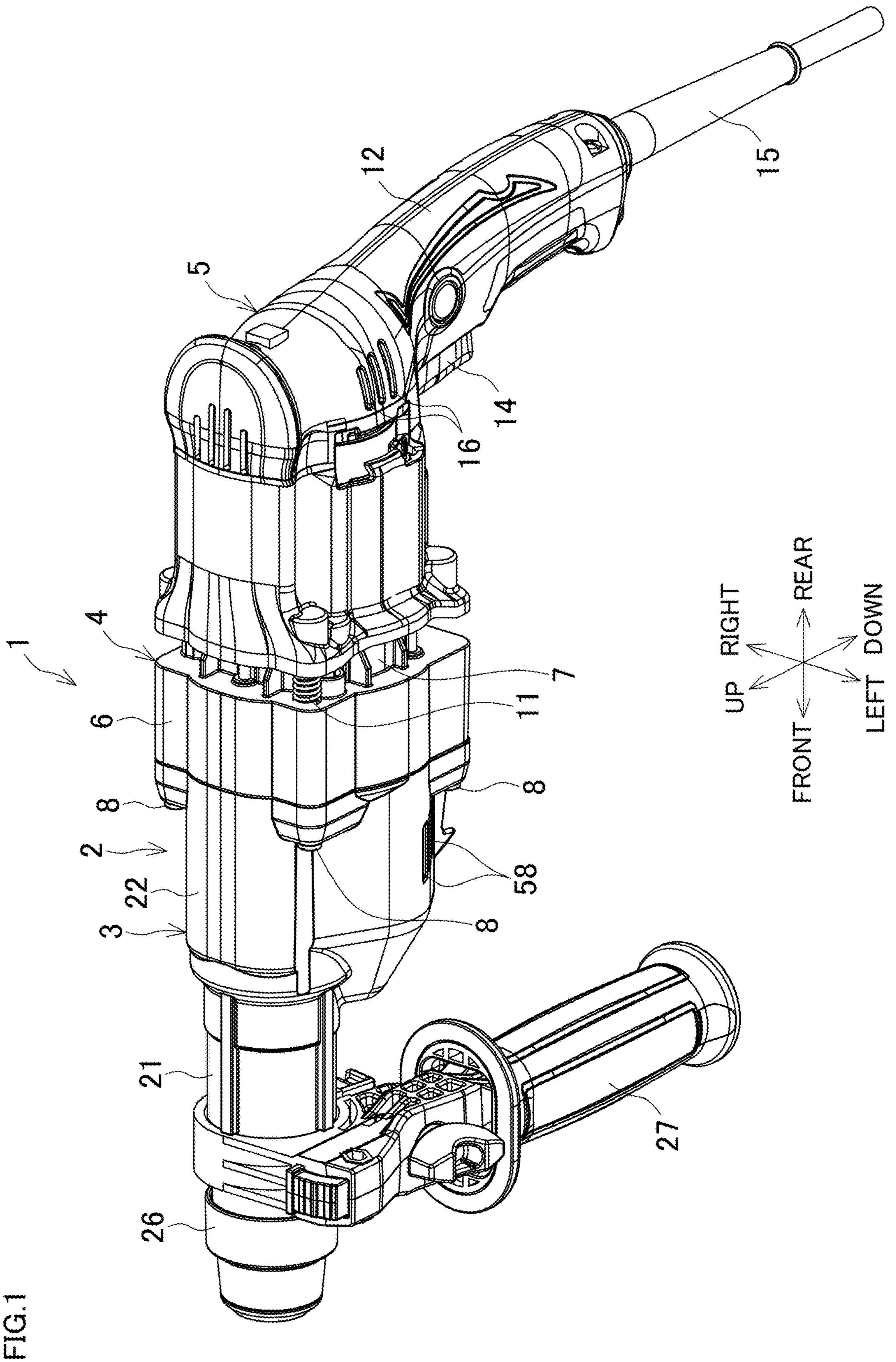
FIG. 1 is a perspective view from a rear of a hammer drill.

In one embodiment of the disclosure, the rotation conversion member may be housed inside the front housing. With the configuration, the heat generated by the actuation of the rotation conversion member can be effectively cooled via the front housing.

In one embodiment of the disclosure, the seal member may be arranged ahead of the rotation conversion member. With the configuration, the outside space of the inner housing where the cooling air flows can be formed to an outside of the rotation conversion member in the radial direction.

In one embodiment of the disclosure, the seal member may be positioned on an outside of the first bearing in a radial direction. With the configuration, the position of the seal member comes close to the frontmost of the inner housing, and the outside space can be widely ensured.

In one embodiment of the disclosure, an air flow passage may be formed on an outside of the rotation conversion member in a radial direction in the outside space. With the configuration, the heat transmitted from the rotation conversion member can be effectively cooled from the outside of the inner housing.

In one embodiment of the disclosure, the front housing may be made of metal. With the configuration, the heat transmitted to the inner housing can be effectively radiated.

In one embodiment of the disclosure, a connecting surface seal member may be disposed on a connecting surface between the front housing and the rear housing. With the configuration, sealing performance can be ensured even when the inner housing is divided into two parts.

In one embodiment of the disclosure, the driving mechanism may include two intermediate shafts parallel to the axis line direction of the tool holder, and one of the intermediate shafts transmits the rotation of the output shaft to the tool holder while another one of the intermediate shafts converts the rotation of the output shaft to the hammering actuation of the bit via the rotation conversion member. With the configuration, one intermediate shaft is assigned to transmit the rotation while the other intermediate shaft is assigned to transmit the hammering, thus ensuring the respective axially shortened intermediate shafts. Accordingly, downsizing of the entire rotation/hammering switching portion is achieved.

In one embodiment of the disclosure, a heat radiating fin may be formed on an outer surface of the front housing. With the configuration, the heat in the inner housing can be effectively radiated.

In one embodiment of the disclosure, the motor may be arranged in a posture such that the output shaft extends along the axis line direction of the tool holder, and a fan is disposed on the output shaft. An air inlet may be disposed on any one side of a front and rear of the housing, an exhaust outlet may be disposed on another side of the front and rear of the housing, and the air inlet and the exhaust outlet may be opposed to one another across an axis line direction of the output shaft. With the configuration, the inner housing can be cooled in a well-balanced manner.

The following describes embodiments of the disclosure based on the drawings.

An outline description of the hammer drill is provided below

Figure 2:
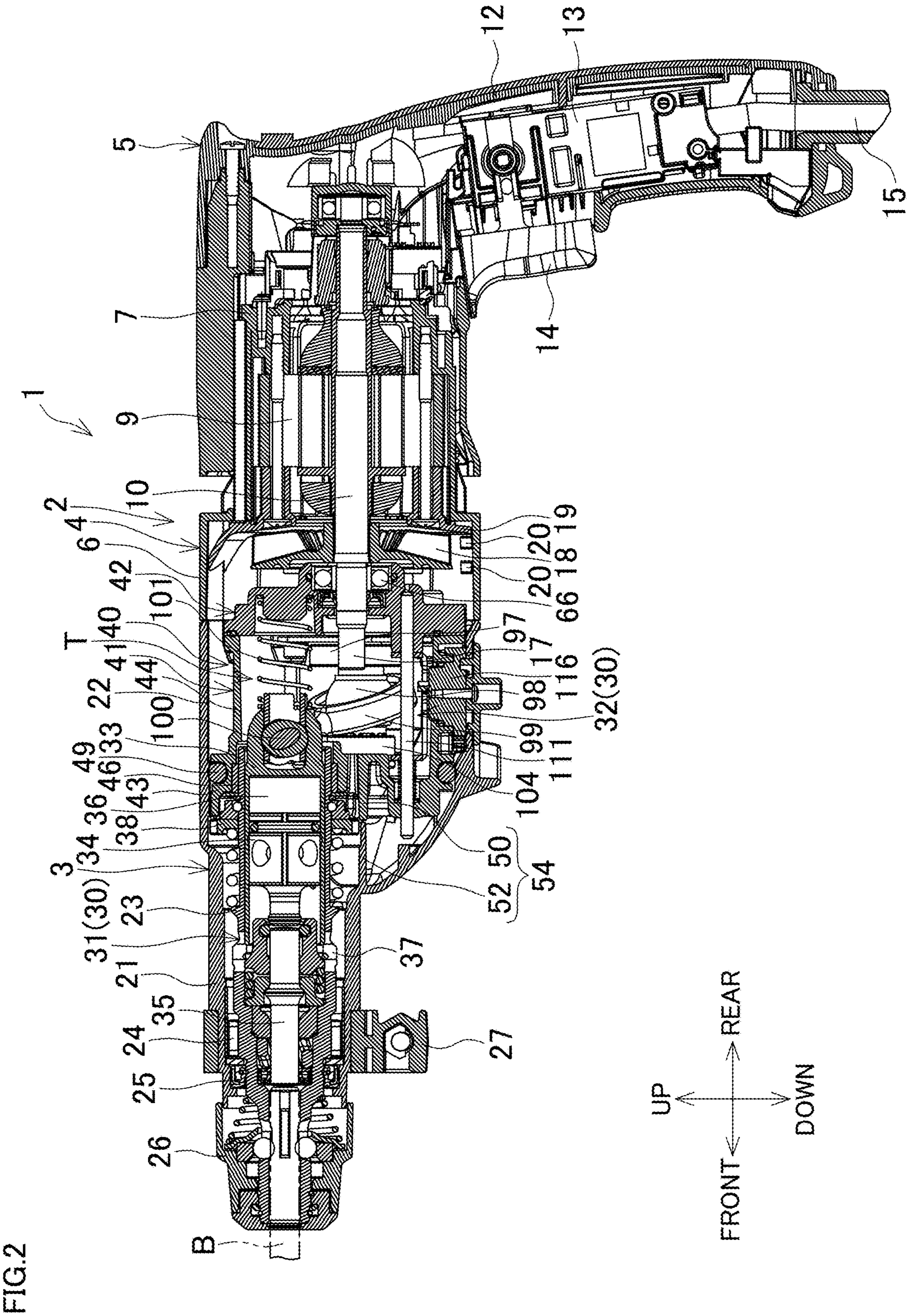
FIG. 2 is a center vertical cross-sectional view of the hammer drill.
Figure 3:
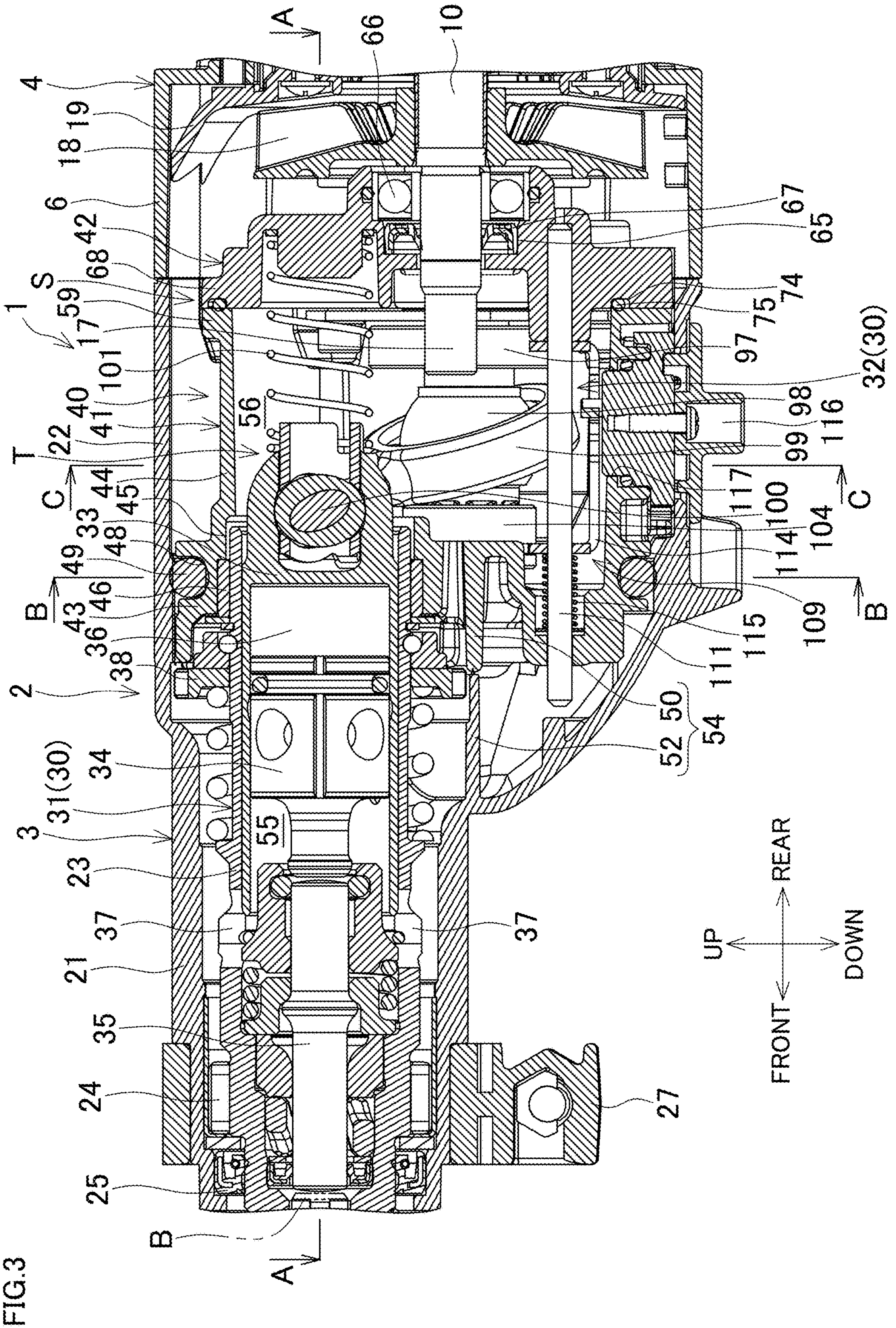
FIG. 3 is an enlarged view of a driving mechanism part in FIG. 2.
Figure 4:
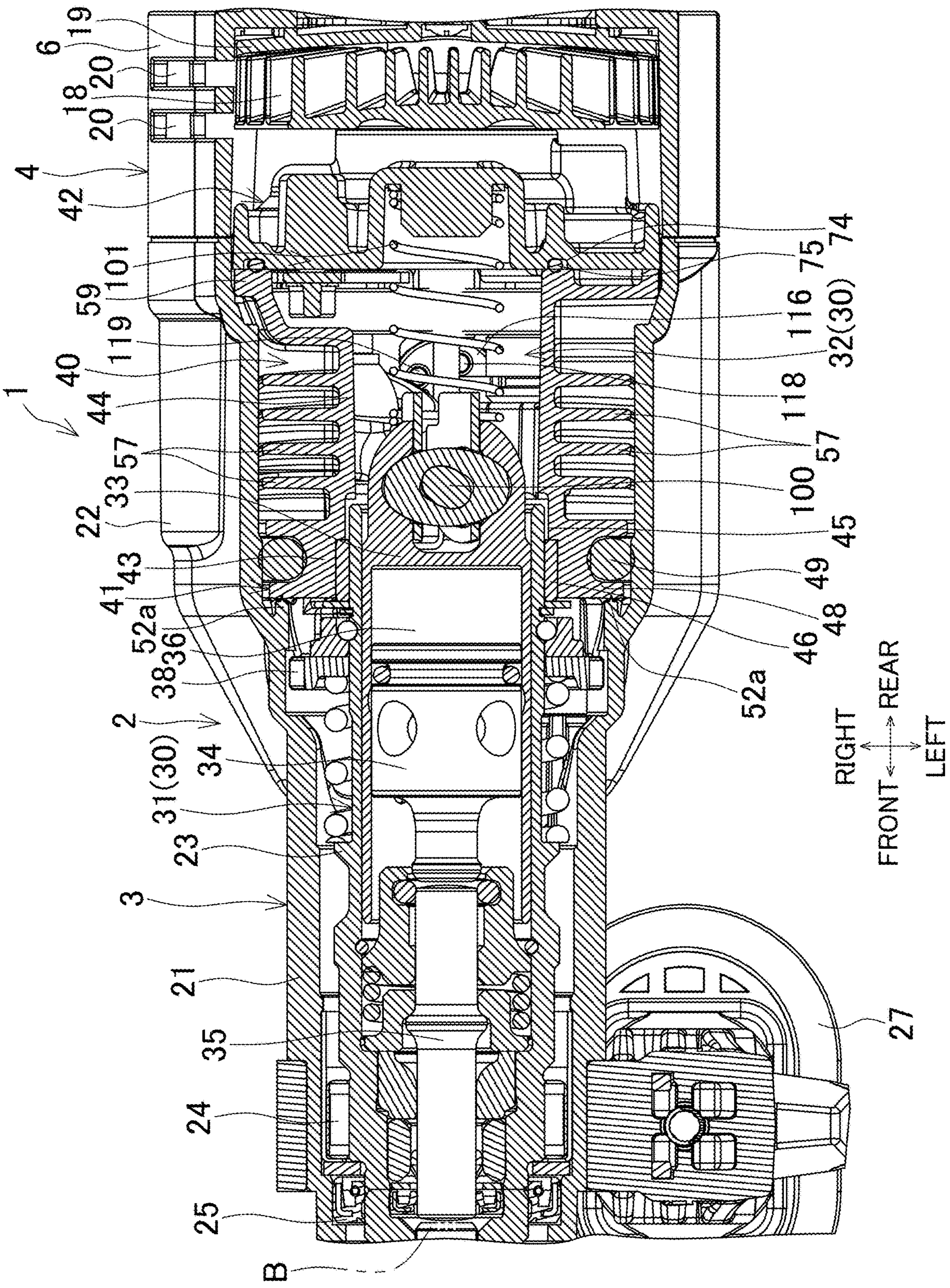
FIG. 4 is a cross-sectional view taken along line A-A in FIG. 3.

FIG. 1 is a perspective view illustrating an example of the hammer drill. FIG. 2 is a center vertical cross-sectional view of the hammer drill. FIG. 3 is an enlarged view of a driving mechanism part in FIG. 2. FIG. 4 is a cross-sectional view taken along line A-A in FIG. 3.

A hammer drill 1 includes a housing 2 that forms an outer wall. The housing 2 includes an outer housing 3 on the front side, a motor housing 4 behind the outer housing 3, and a handle housing 5 behind the motor housing 4.

Figure 5:
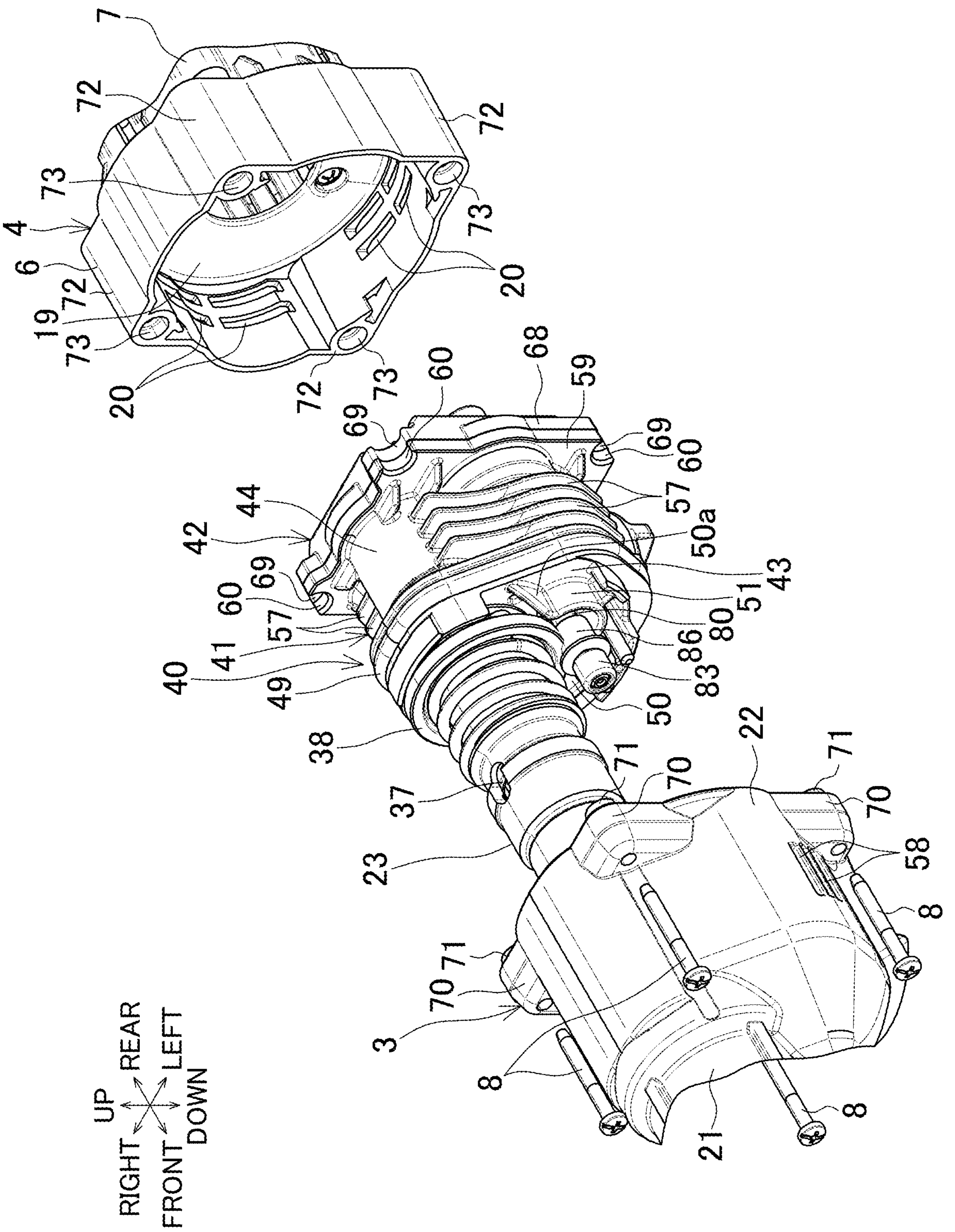
FIG. 5 is an exploded perspective view of an outer housing, a motor housing, and an inner housing.

The motor housing 4 includes a connecting portion 6 having a square shape in a front view on the front side and a tubular motor housing portion 7 on the rear side. As illustrated in FIG. 5, the connecting portion 6 is connected to the outer housing 3 from the front at the four corners in the front view by four screws 8, 8. A motor 9 is housed in the motor housing portion 7 in a posture in which an output shaft 10 is faced forward.

The handle housing 5 is externally mounted to the motor housing portion 7 from the rear and relatively movable in a front-rear direction. The handle housing 5 is biased to a retreated position via a vibration absorbing mechanism using a coil spring 11.

On the rear end of the handle housing 5, a handle 12 extending to a downward direction is formed. A switch 13 in which a trigger 14 is projected forward is housed inside the handle 12. A power supply cord 15 is connected to the switch 13. The power supply cord 15 is extracted from the lower end of the handle 12. A plurality of air inlets 16, 16 extending in the front-rear direction are each formed on the right and left side surfaces of the handle 12. The right and left air inlets 16 are arranged so as to be opposed sandwiching an axis line of the output shaft 10.

The output shaft 10 of the motor 9 passes through the connecting portion 6 and projects into the outer housing 3. A pinion 17 is formed on the front end of the output shaft 10. A fan 18 is secured to the output shaft 10 inside the connecting portion 6. A baffle plate 19 is secured behind the fan 18 and inside the connecting portion 6. A plurality of rear exhaust outlets 20, 20 are each formed outside of the fan 18 in the radial direction and on the lower surface and the right side surface of the connecting portion 6.

The outer housing 3 includes a front cylinder portion 21 and a rear cylinder portion 22. The front cylinder portion 21 has a tubular shape extending forward and a circular shape in the cross section. The rear cylinder portion 22 has a larger diameter than the front cylinder portion 21 and has a tubular shape with a hexagonal shape in a front view. The front cylinder portion 21 is arranged at an eccentric position on the upper side of the rear cylinder portion 22.

Inside the front cylinder portion 21, a tubular tool holder 23 is coaxially housed. The tool holder 23 has a front end projecting forward from the front cylinder portion 21. A bearing 24 supporting the front portion of the tool holder 23 is held onto the front end of the front cylinder portion 21. An oil seal 25 sealing between the front cylinder portion 21 and the tool holder 23 is disposed ahead of the bearing 24.

On the front end of the tool holder 23 projecting from the front cylinder portion 21, an operation sleeve 26 is disposed. The operation sleeve 26 is disposed for performing attachment and removal operations of a bit B at the front end of the tool holder 23. A side grip 27 is mounted to the front end of the front cylinder portion 21.

Inside the outer housing 3, a driving mechanism 30 is disposed. The driving mechanism 30 includes a rotation/hammering actuation portion 31 and a rotation/hammering switching portion 32 behind the rotation/hammering actuation portion 31.

The rotation/hammering actuation portion 31 includes the tool holder 23, a piston cylinder 33, a striker 34, and an impact bolt 35. The piston cylinder 33 has a front end opened and is housed to be movable back and forth at the rear portion of the tool holder 23. The striker 34 is housed to be movable back and forth into the piston cylinder 33 via an air chamber 36. The impact bolt 35 is housed to be movable back and forth ahead of the striker 34 and into the tool holder 23. The tool holder 23 is communicated with the inside of the front cylinder portion 21 by a plurality of through holes 37, 37. The tool holder 23 includes a rear portion projecting into the rear cylinder portion 22. A gear

38 with a torque limiter is disposed on the outer periphery of the tool holder 23 inside the rear cylinder portion 22.

Inside the connecting portion 6 and the rear cylinder portion 22, an inner housing 40 is housed. The inner housing 40 supports the rear portion of the tool holder 23 on the rear side of the gear 38. The rotation/hammering switching portion 32 is housed inside the inner housing 40. The rotation/hammering switching portion 32 switches an operation mode by operating a switching knob 116 disposed on the lower surface of the rear cylinder portion 22 and transmits the rotation of the output shaft 10 to the rotation/hammering actuation portion 31.

A description of the inner housing is provided below.

The inner housing 40 is divided into front and rear parts and includes a front housing 41 made of metal and a rear housing 42 made of resin.

Figure 6:
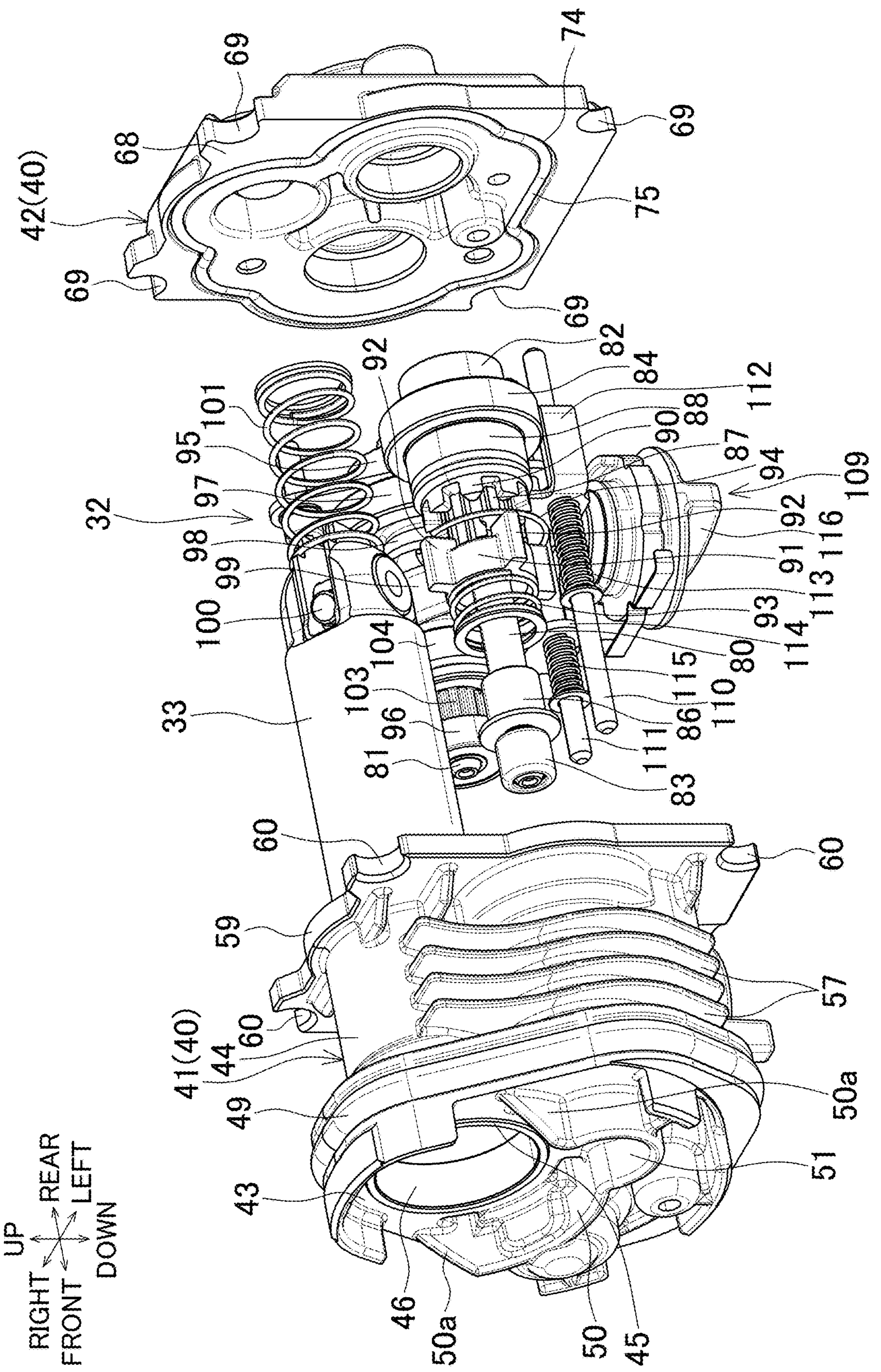
FIG. 6 is an exploded perspective view of the inner housing.

As illustrated in FIG. 6, the front housing 41 includes a bearing holder 43 on the front side and a trunk portion 44 on the rear side.

Figure 7:
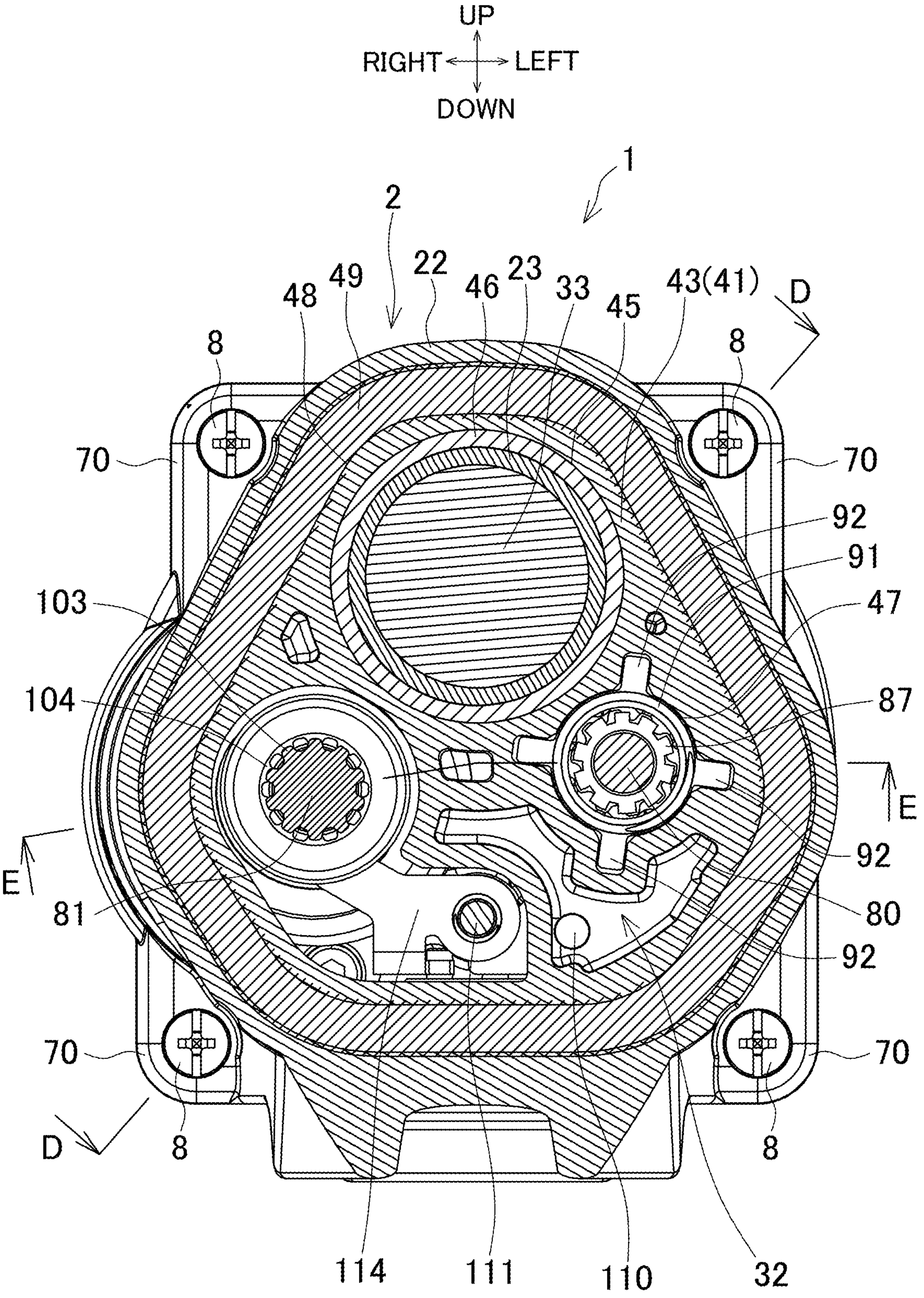
FIG. 7 is a cross-sectional view taken along line B-B in FIG. 3.

The bearing holder 43 has a hexagonal shape in a front view, which is slightly smaller than the rear cylinder portion 22. As illustrated in FIG. 7, the bearing holder 43 includes an upper through-hole 45 in the center of the right and left on the upper portion. The rear portion of the tool holder 23 is inserted into the upper through-hole 45. A bearing metal 46 supporting the rear portion of the tool holder 23 is held inside the upper through-hole 45. A lower through-hole 47 having a smaller diameter than the upper through-hole 45 is formed on the lower left side of the upper through-hole 45.

Outside of the bearing metal 46 in the radial direction and on the outer peripheral surface of the bearing holder 43, a depressed groove 48 is formed over the whole circumference. An O-ring 49 is held onto the depressed groove 48. The O-ring 49 is pressed against the inner peripheral surface of the rear cylinder portion 22 to seal between the rear cylinder portion 22 and the bearing holder 43. Accordingly, space between the outer housing 3 and the inner housing 40 is partitioned into a front and rear with the O-ring 49 as a boundary. On the front side of the O-ring 49, space between the tool holder 23 and the outer housing 3 is sealed at the front by the oil seal 25.

Figure 8:
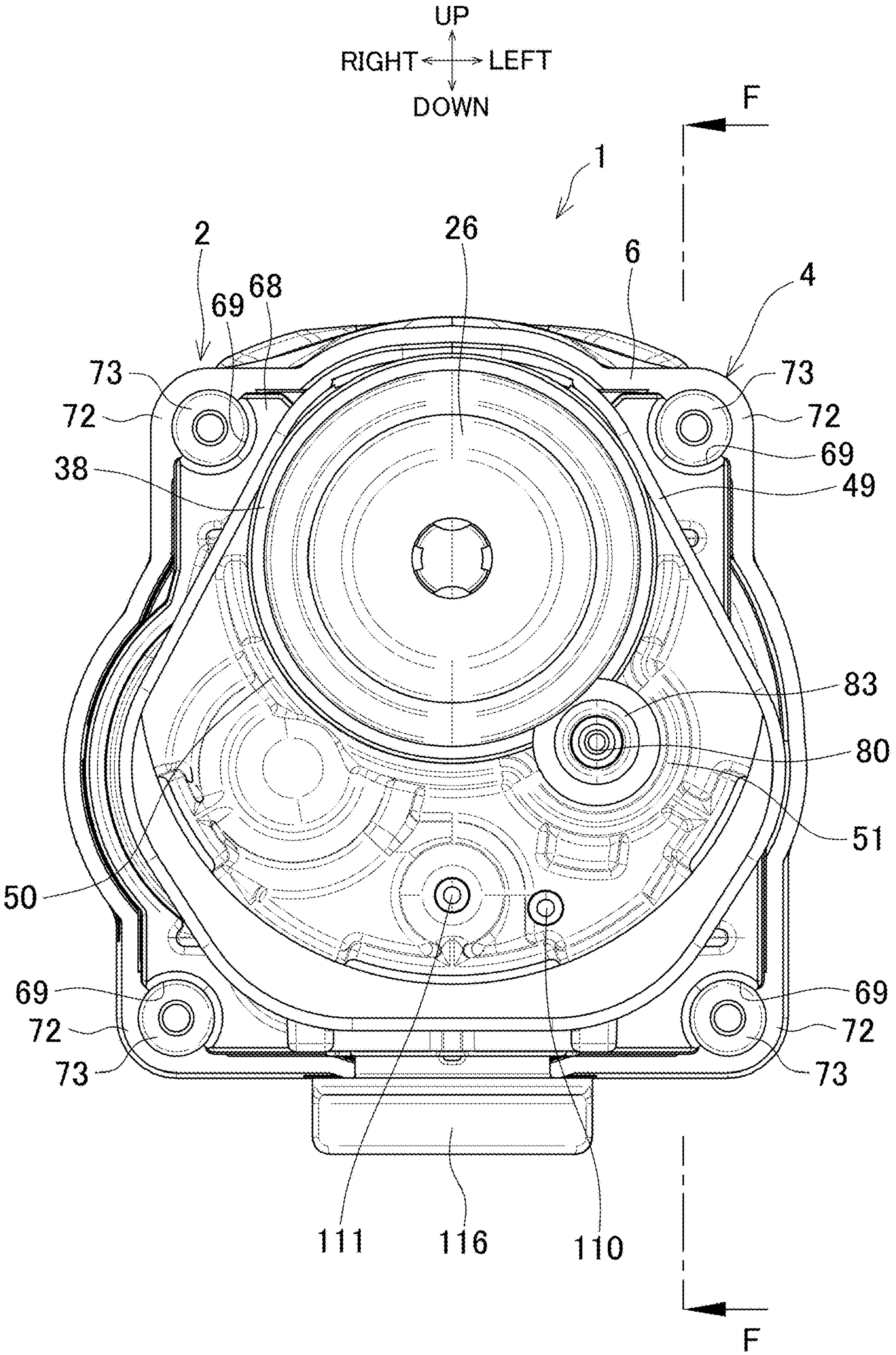
FIG. 8 is an enlarged front view of the inner housing and the motor housing from which the outer housing is omitted.

On the front face of the bearing holder 43, an inner-side rib 50 is formed facing forward. As illustrated in FIG. 8, in a front view, the inner-side rib 50 is formed in an arc shape in the front view such that the inner-side rib 50 surrounds the lower half of the gear 38 of the tool holder 23 projecting from the upper through-hole 45. The front end of the inner-side rib 50 overlaps the gear 38 in the radial direction. The left side of the inner-side rib 50 configures a semicircular shape portion 51 that surrounds the lower through-hole 47 from an outside. The front face of the bearing holder 43 surrounded by the O-ring 49 is partitioned into upper and lower parts by the inner-side rib 50. Both right and left ends of the inner-side rib 50 configure inclined portions 50*a*, 50*a* that retreat as heading upward. The front end of the intermediate portion of the inner-side rib 50 is positioned at the frontmost from the bearing holder 43.

Figure 9:
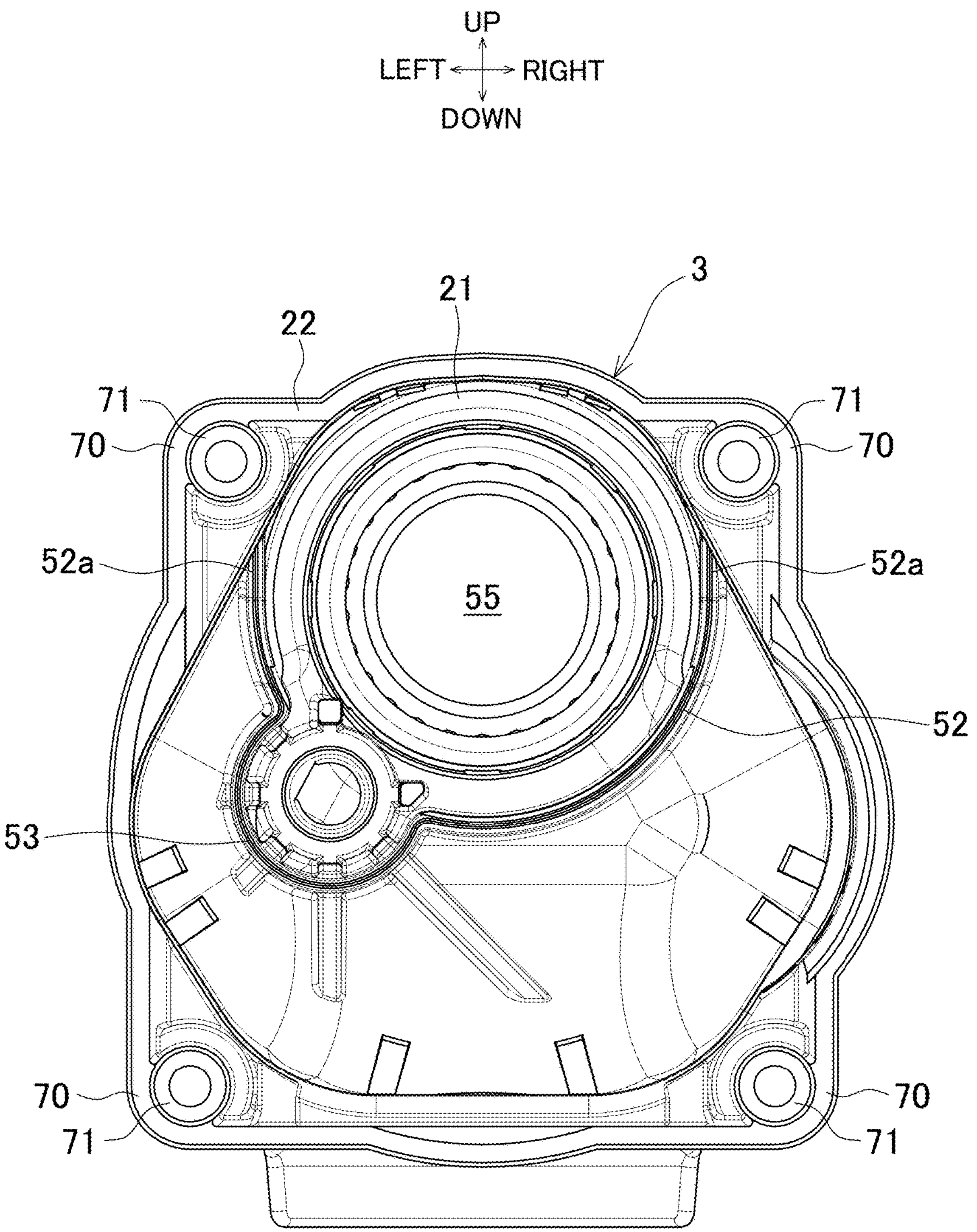
FIG. 9 is an enlarged back view of the outer housing.

On the other hand, in the outer housing 3, on the inner surface on the front side of the rear cylinder portion 22, as illustrated in FIG. 9, an outer-side rib 52 opposed to the inner-side rib 50 of the bearing holder 43 and projecting rearward is formed. The outer-side rib 52 is a rib (what is called a crush rib) that projects to the lower side of the gear 38 in an assembled state of the inner housing 40 and is brought into close contact with the inner-side rib 50 by being pressed against the front end of the inner-side rib 50 to cause the rear end to be deformed. The outer-side rib 52 is formed so as to be mirror symmetrical to the inner-side rib 50 in the front and rear and includes a semicircular shape portion 53 opposed to the semicircular shape portion 51 on the left side. As illustrated in FIG. 4, the outer-side rib 52 includes upper end portions 52*a*, 52*a* on both right and left end sides projecting forward and abut on the front face of the bearing holder 43. The upper end portions 52*a*, 52*a* have rear edges being in an inclined shape going forward as heading downward and fit the inclined portions 50*a*, 50*a* on both right and left ends of the inner-side rib 50.

Figure 10:
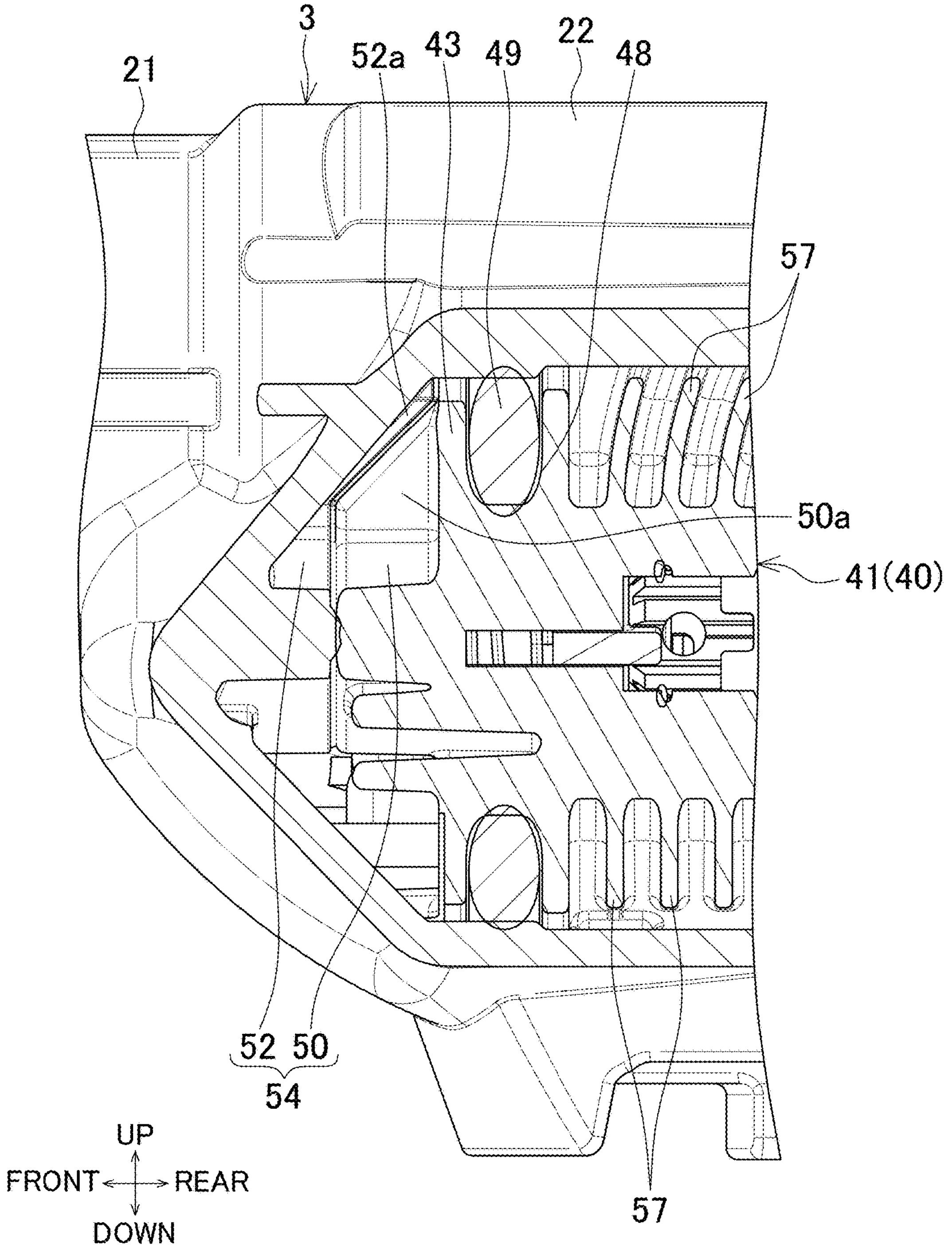
FIG. 10 is a cross-sectional view (with the outer housing) taken along line F-F in FIG. 8.

Accordingly, in a state where the inner housing 40 is assembled to the outer housing 3, as illustrated in FIG. 10, a partition wall 54 is formed by butting the outer-side rib 52 and the inner-side rib 50 together. Accordingly, inside the outer housing 3, front space of the O-ring 49 is divided into upper and lower parts by the partition wall 54. The upper side of the partition wall 54 configures a front-side grease chamber 55 defined between the oil seal 25 and the O-ring 49. The front-side grease chamber 55 is communicated with a rear-side grease chamber 56 inside the inner housing 40 via the lower through-hole 47 and the like. The front-side grease chamber 55 and the rear-side grease chamber 56 configure a driving mechanism housing region (hereinafter abbreviated as a "housing region") T.

Figure 11:
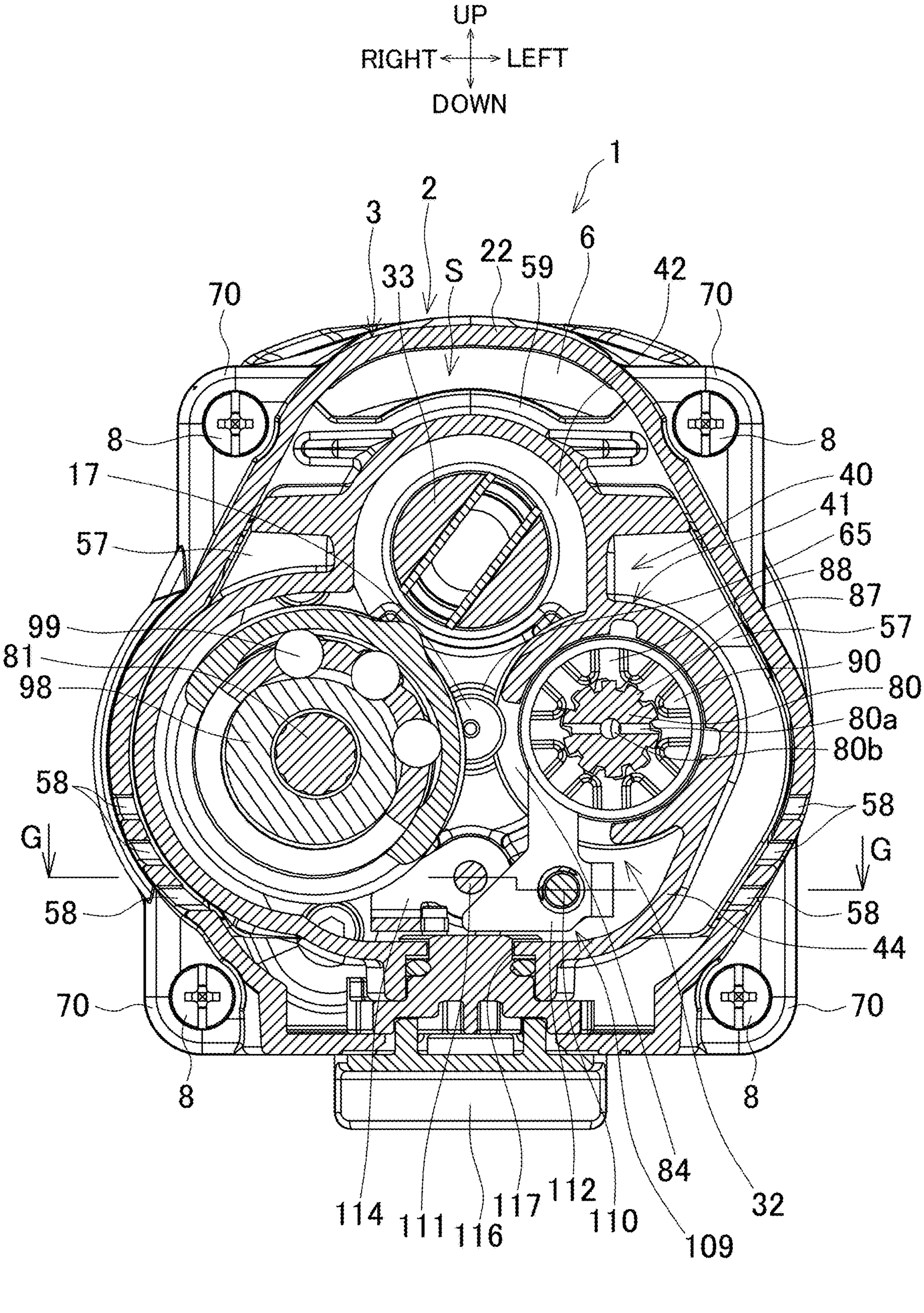
FIG. 11 is a cross-sectional view taken along line C-C in FIG. 3.

The trunk portion 44 has a tubular shape with a hexagonal shape in a front view, which is slightly smaller than the bearing holder 43. A plurality of heat radiating fins 57, 57 are each disposed upright on the right and left side surfaces of the trunk portion 44. Each of the heat radiating fins 57 is formed so as to extend in an up-down direction and disposed upright at predetermined intervals in the front-rear direction. As illustrated in FIG. 11, each of the heat radiating fins 57 has an outside end edge that comes close to the inner surface of the rear cylinder portion 22. A plurality of front exhaust outlets 58, 58 extending in the front-rear direction are each formed outside in a projection direction of the heat radiating fins 57 and on the right and left side surfaces of the rear cylinder portion 22. The right and left front exhaust outlets 58 are arranged to be opposed sandwiching an axis line direction of the output shaft 10 in a plan view.

On the rear end of the trunk portion 44, a front flange 59 having a square shape in a front view is formed. Four semicircular cutouts 60, 60 are formed at the respective four corners of the front flange 59.

As illustrated in FIG. 3 and FIG. 11, the rear housing 42 has a rear through-hole 65 approximately in the center. The output shaft 10 passes through the rear through-hole 65. A bearing 66 supporting the output shaft 10 is held onto the rear portion of the rear through-hole 65. An oil seal 67 is disposed on the front side of the bearing 66.

On the front end of the rear housing 42, a rear flange 68 having a square shape in a front view, which is identical to the front flange 59 of the trunk portion 44, is formed. Four semicircular cutouts 69, 69 are formed also at the respective four corners of the rear flange 68.

The front flange 59 and the rear flange 68 are sandwiched between the rear cylinder portion 22 of the outer housing 3 and the connecting portion 6 of the motor housing 4 in an overlapped state in the front and rear. As illustrated in FIG. 5, FIG. 7, and FIG. 9, four screwing portions 70, 70 projecting out to the four corners in a front view are formed on the rear end of the rear cylinder portion 22. A circular-shaped screw boss 71 projecting rearward is each formed on the rear face of each of the screwing portions 70.

Figure 12:
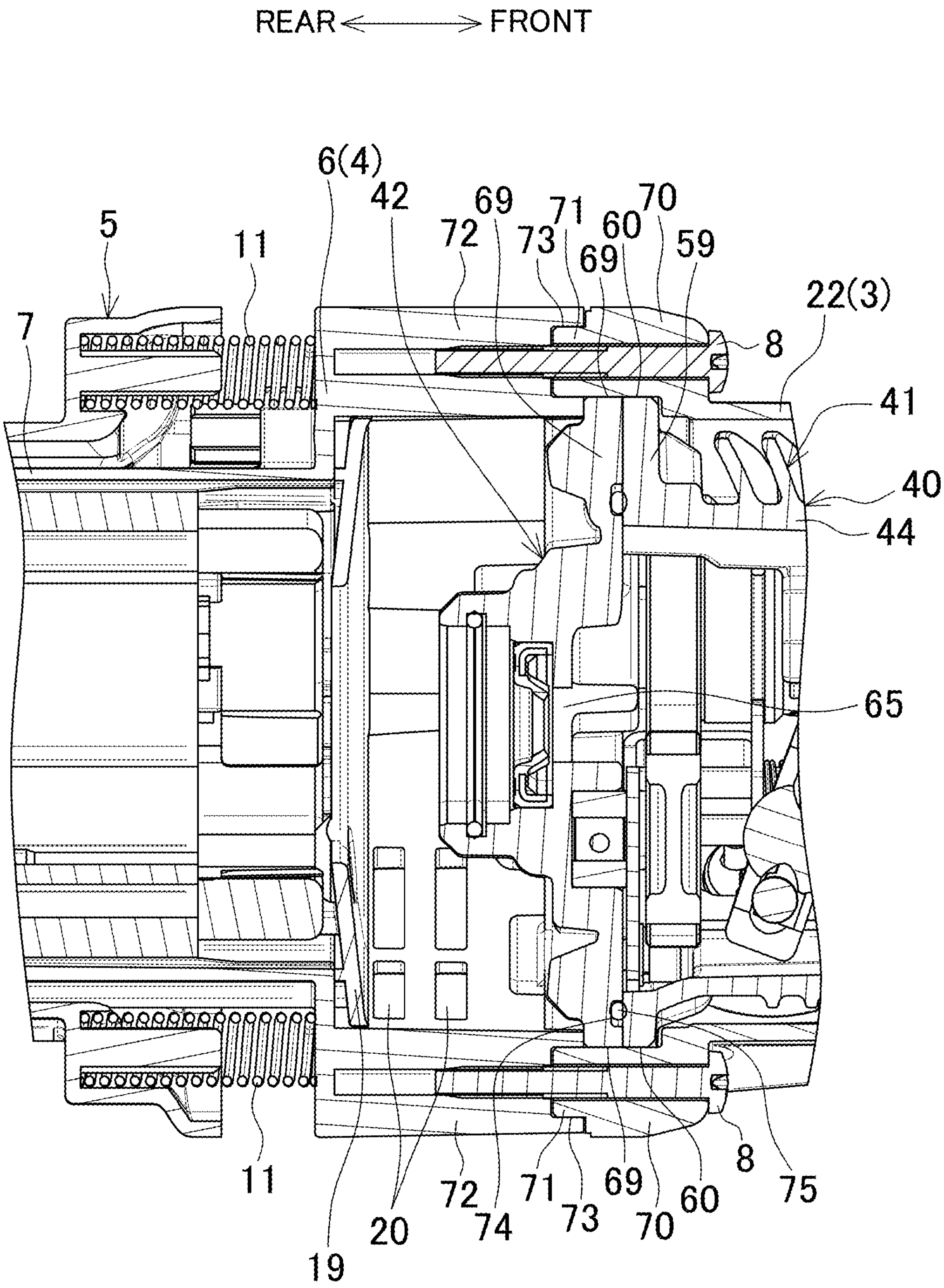
FIG. 12 is a cross-sectional view taken along line D-D in FIG. 7.
Figure 13:
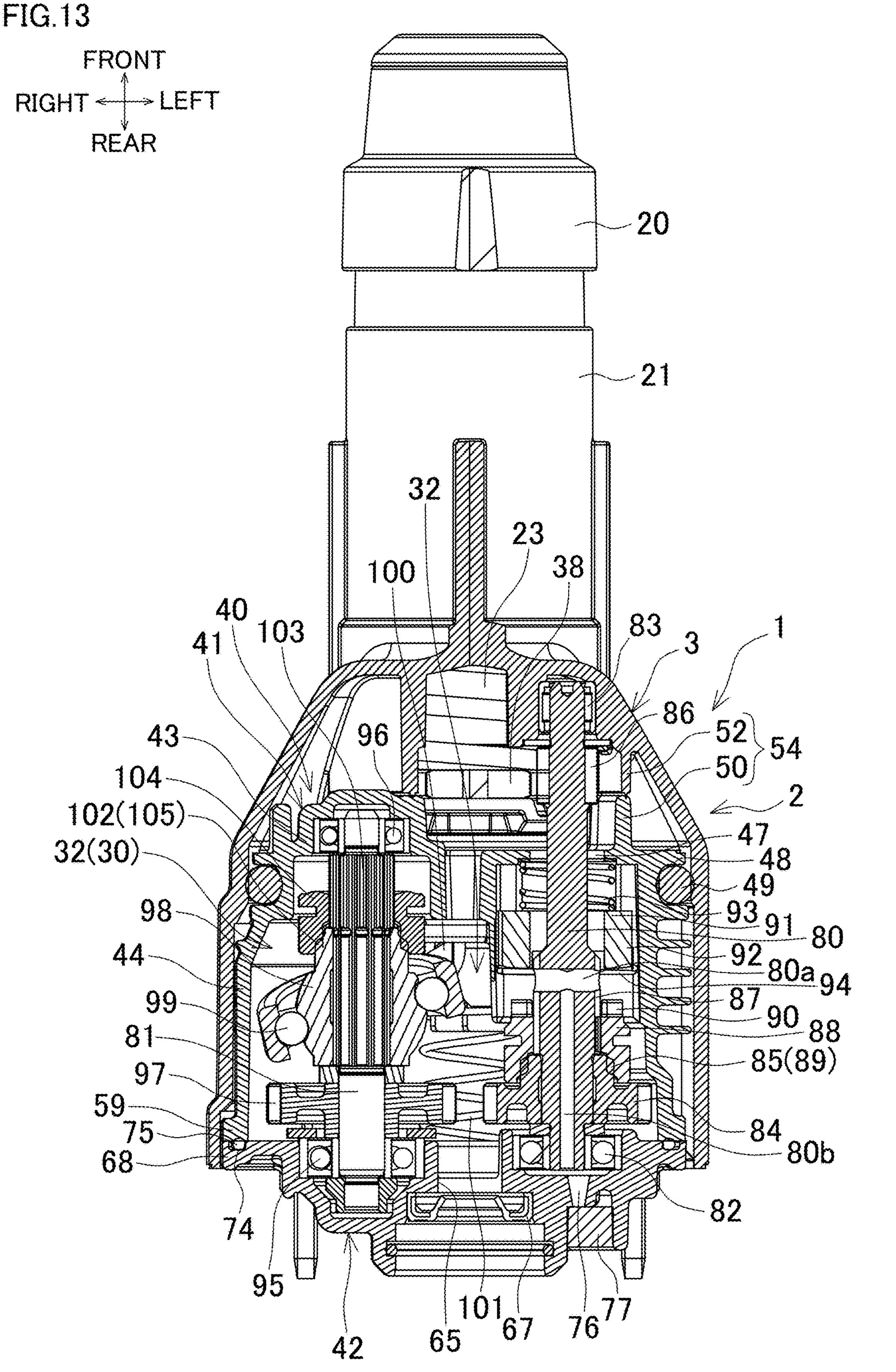
FIG. 13 is a cross-sectional view taken along line E-E in FIG. 7.

On the other hand, as illustrated in FIG. 5 and FIG. 8, corresponding to the respective screwing portions 70, four female threaded portions 72, 72 having a female thread hole are formed at the respective four corners of the connecting portion 6. A circular depressed portion 73 to which the screw boss 71 is fitted is formed on the front face of each of the female threaded portions 72. Specifically, as illustrated in FIG. 12, an inlaying and connecting, in which each screw boss 71 is fitted to the circular depressed portion 73 in a state of screwing by the screw 8, is configured.

The front flange 59 and the rear flange 68 are sandwiched between the screwing portions 70 and the female threaded portions 72 in a state where the cutouts 60, 69 at the four corners are each engaged with the outer periphery of the screw boss 71 from the inside. In this state, the respective screwing portions 70 and the female threaded portions 72 are screwed by the screws 8, 8 from the front. Then, connecting of the outer housing 3 to the motor housing 4 is made while the front flange 59 and the rear flange 68 are pressed from both front and rear faces and assembled. At this time, the rear end surfaces of the respective screwing portions 70 and the front end surfaces of the respective female threaded portions 72 are not in contact. Thus, the inner housing 40 is positioned at the rear portion of the outer housing 3.

In the positioning state, as illustrated in FIG. 3 and FIG. 11, a gap S is formed on the upper side between the rear cylinder portion 22 and the front and rear flanges 59, 68. Accordingly, the inside of the connecting portion 6 in which the fan 18 is housed is communicated with the gap S behind the O-ring 49. The gap S is communicated with space between the rear cylinder portion 22 and the front housing 41 and communicated with the front exhaust outlets 58 through between the heat radiating fins 57.

As illustrated in FIG. 6, a groove 74 is formed over the whole circumference on the front face of the rear flange 68 and at the abutting position with the front flange 59. An O-ring 75 is held inside the groove 74. The O-ring 75 abuts on the rear face of the front flange 59 in the assembling state of the inner housing 40 and seals between the front flange 59 and the rear flange 68.

A description of the rotation/hammering switching portion is provided below. As illustrated in FIG. 6, FIG. 7, FIG. 11, and FIG. 13, the rotation/hammering switching portion 32 includes a first and second intermediate shafts 80, 81 as two shafts on the right and left on the lower side of the tool holder 23. The first and second intermediate shafts 80, 81 are parallel to one another and arranged parallel to the tool holder 23.

The first intermediate shaft 80 on the left side has a rear end rotatably supported by the rear housing 42 via a bearing 82. The first intermediate shaft 80 has a front end passing through the lower through-hole 47 of the front housing 41 and extending forward. The front end of the first intermediate shaft 80 is rotatably supported by the front side inner surface of the rear cylinder portion 22 via a bearing 83. A first gear 84 that meshes with the pinion 17 of the output shaft 10 is externally mounted to be rotatable on the rear portion of the first intermediate shaft 80. A gear-side engaging portion 85 is formed on the front portion outer periphery of the first gear 84.

Ahead of the lower through-hole 47 and on the front portion of the first intermediate shaft 80, a second gear 86 is formed. The second gear 86 meshes with the gear 38 of the tool holder 23. A first spline portion 87 is formed ahead of the first gear 84 and on the first intermediate shaft 80. A first clutch 88 is spline-connected to the first spline portion 87. The first clutch 88 is disposed to be integrally rotatable with the first intermediate shaft 80 and to be movable back and forth and includes a rear engaging portion 89 and a front engaging portion 90. In the first clutch 88, the rear engaging portion 89 is engaged with the gear-side engaging portion 85 of the first gear 84 at a retreated position. Accordingly, the rotation of the first gear 84 is transmitted to the first intermediate shaft 80 via the first clutch 88.

Ahead of the first clutch 88 and onto the lower through-hole 47 of the front housing 41, a lock ring 91 is held. The lock ring 91 includes four stops 92, 92 on the outer periphery. The lock ring 91 is biased to a retreated position where the stops 92 are brought into contact with a stop ring 94 by a coil spring 93 ahead of the lock ring 91. The first clutch 88 is separated from the first gear 84 at an advance position and the front engaging portion 90 is engaged with the stops 92 of the lock ring 91. Accordingly, the rotation of the first gear 84 is not transmitted to the first intermediate shaft 80, and the rotation of the first intermediate shaft 80 is locked together with the first clutch 88. At this time, the rotation of the tool holder 23 is also locked via the gear 38 meshing with the second gear 86 of the first intermediate shaft 80. However, the first clutch 88 is in a state of not being engaged with any of the first gear 84 or the lock ring 91 at an intermediate position between the advance position and the retreated position.

On the first intermediate shaft 80, a through-hole 80*a* is formed in a diametrical direction on the rear side of the lock ring 91. In the axial center of the first intermediate shaft 80, an axial center hole 80*b* communicated with the through-hole 80*a* is formed up to the rear end surface. A relief hole 76 is formed to pass through behind the bearing 82 and in the rear housing 42. The relief hole 76 is communicated with the axial center hole 80*b*.

Accordingly, pressure increased inside the inner housing 40 is released to the outside of the inner housing 40 via the through-hole 80*a*, the axial center hole 80*b*, and the relief hole 76. The relief hole 76 has an outlet on which an absorber 77, such as a sponge, is disposed to avoid grease leakage.

The second intermediate shaft 81 on the right side has a rear end rotatably supported by the rear housing 42 via a bearing 95. The second intermediate shaft 81 has a front end rotatably supported by the bearing holder 43 of the front housing 41 via a bearing 96. A third gear 97 that meshes with the pinion 17 of the output shaft 10 is secured to the rear portion of the second intermediate shaft 81 to be integrally rotatable. A boss sleeve 98 is externally mounted to be rotatable in a separated body ahead of the third gear 97 and on the second intermediate shaft 81. A swash bearing 99 with an axis line inclined is disposed on the boss sleeve 98. The swash bearing 99 includes an outer race on which an arm 100 is disposed to project to an upward direction. The arm 100 has a distal end connected to the rear end of the piston cylinder 33. A coil spring 101 is interposed between the rear end of the piston cylinder 33 and the rear housing 42. The coil spring 101 biases the piston cylinder 33 to an advance position in a drill mode described later. A boss-side engaging portion 102 is formed on the front portion of the boss sleeve 98.

Ahead of the boss sleeve 98 and on the second intermediate shaft 81, a second spline portion 103 is formed. A second clutch 104 is spline-connected to the second spline portion 103. The second clutch 104 is disposed to be integrally rotatable with the second intermediate shaft 81 and to be movable back and forth and includes a clutch-side engaging portion 105 on the rear portion. In the second clutch 104, the clutch-side engaging portion 105 is engaged with the boss-side engaging portion 102 of the boss sleeve 98 at a retreated position. Accordingly, the rotation of the second intermediate shaft 81 is transmitted to the boss sleeve 98 via the second clutch 104. When the second clutch 104 advances, the clutch-side engaging portion 105 is separated from the boss-side engaging portion 102 and the rotation of the second intermediate shaft 81 is not transmitted to the boss sleeve 98.

Figure 14:
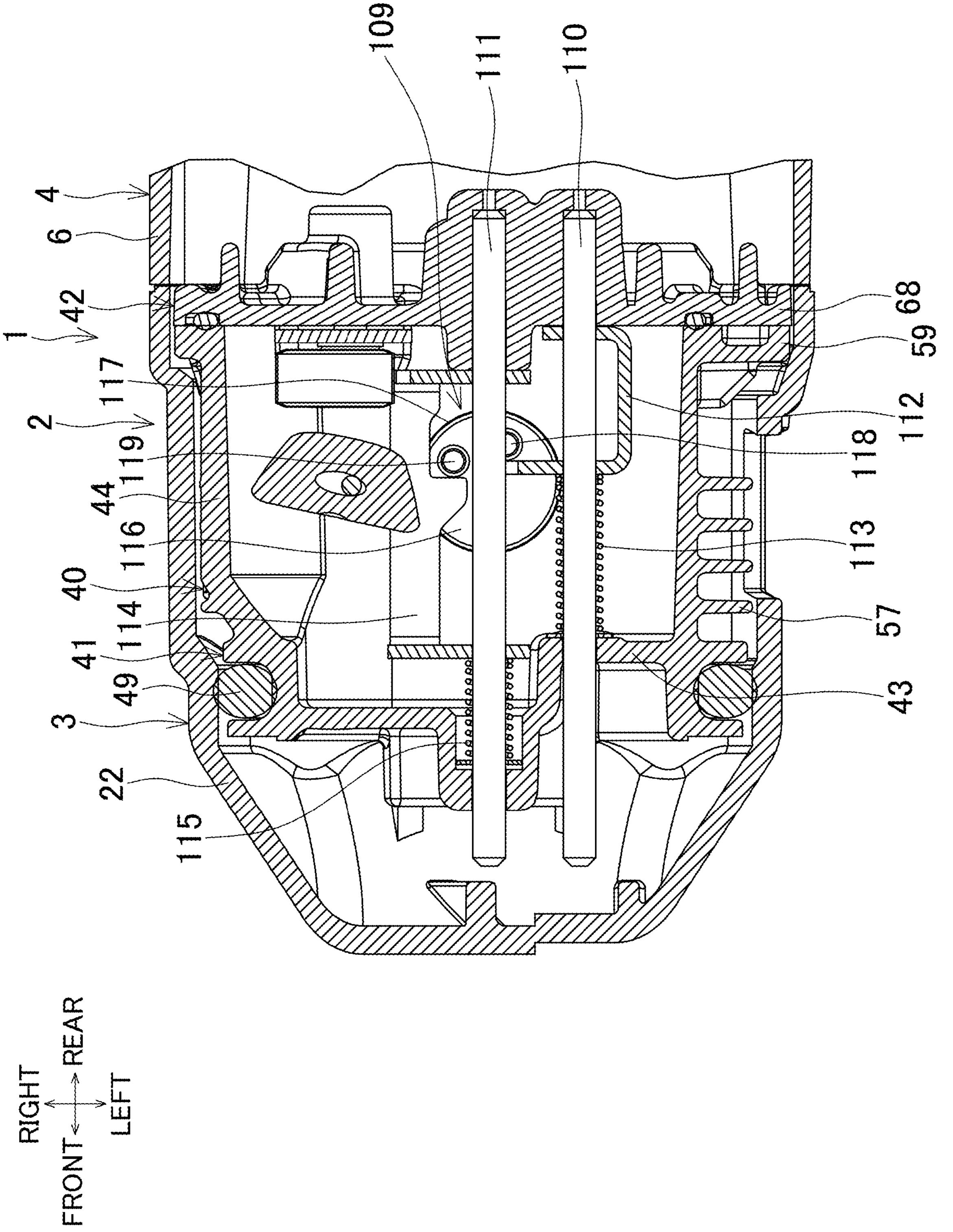
FIG. 14 is a cross-sectional view taken along line G-G in FIG. 11.

Below the first and second intermediate shafts 80, 81, a mode switch mechanism 109 is disposed. As illustrated in FIG. 14, the mode switch mechanism 109 includes a first and second rods 110, 111 as two rods on the right and left and the switching knob 116.

The first and second rods 110, 111 are parallel to one another and arranged parallel to the first and second intermediate shafts 80, 81.

The first rod 110 has a rear end supported by the rear housing 42 and a front end supported by the bearing holder 43 of the front housing 41. The first rod 110 includes a first plate 112. The first plate 112 is a strip plate that includes an intermediate portion extending parallel to the first rod 110. Both front and rear ends of the first plate 112 are folded to the first rod 110 side and let the first rod 110 to pass through. Accordingly, the first plate 112 is movable back and forth along the first rod 110. The first plate 112 has a front end that is engaged with the outer periphery of the first clutch 88. A coil spring 113 is externally mounted ahead of the first plate 112 and on the first rod 110. The coil spring 113 biases the first plate 112 to a retreated position where the first plate 112 is brought into contact with the front face of the rear housing 42. The retreated position is the retreated position of the first clutch 88 that retreats together with the first plate 112.

The second rod 111 has a rear end supported by the rear housing 42 and a front end supported by the bearing holder 43 of the front housing 41. The second rod 111 includes a second plate 114. The second plate 114 is a strip plate that includes an intermediate portion extending parallel to the second rod 111. Both front and rear ends of the second plate 114 are folded to the second rod 111 side and let the second rod 111 to pass through. Accordingly, the second plate 114 is movable back and forth along the second rod 111. The second plate 114 has a front end that is engaged with the outer periphery of the second clutch 104. A coil spring 115 is externally mounted ahead of the second plate 114 and on the second rod 111. The coil spring 115 biases the second plate 114 to a retreated position where the second plate 114 is brought into contact with the rear housing 42. The retreated position is the retreated position of the second clutch 104 that retreats together with the second plate 114.

Figure 15:
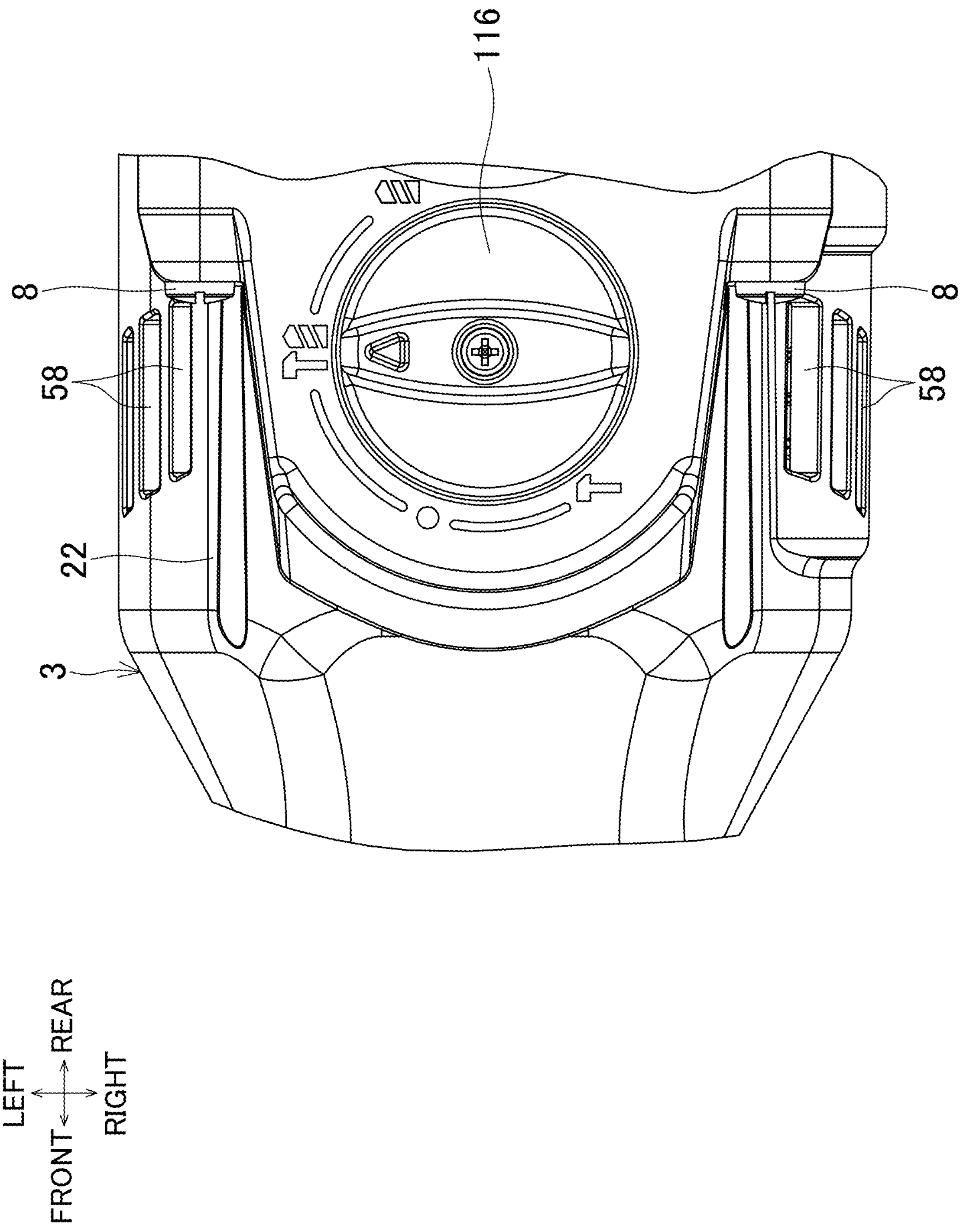
FIG. 15 is a partial bottom view of the outer housing.

Positions of the first and second plates 112, 114 are changeable by the switching knob 116. As illustrated in FIG. 15, the switching knob 116 is disposed to be rotationally operable to the lower surface of the rear cylinder portion 22. As illustrated in FIG. 3 and FIG. 11, the switching knob 116 projects into the inner housing 40 via a bottom through-hole 117 provided on the lower surface of the trunk portion 44 of the front housing 41. The switching knob 116 has a projecting end surface on which first and second eccentric pins 118, 119 are disposed. The first eccentric pin 118 is engaged with the front end of the first plate 112 from the rear, and the second eccentric pin 119 is engaged with the intermediate portion of the second plate 114 from the rear.

Accordingly, by the rotation operation of the switching knob 116, the front-rear positions of the first and second plates 112, 114 can be switched via the first and second eccentric pins 118, 119. Specifically, the operation mode can be switched between the drill mode, a hammer drill mode, a hammer mode (rotation lock), and a hammer mode (neutral).

A description of actuation of the hammer drill is provided below.

The switching knob 116 is switched to the drill mode. Then, the first eccentric pin 118 comes to the most retreated position, and the first clutch 88 comes to the retreated position together with the first plate 112. Accordingly, the rotation of the first gear 84 is put into a state of being transmitted to the first intermediate shaft 80 via the first clutch 88. The rotation of the first intermediate shaft 80 is put into a state of being transmitted from the second gear 86 to the tool holder 23 via the gear 38.

Meanwhile, the second eccentric pin 119 comes to the most advance position, and the second clutch 104 comes to the advance position together with the second plate 114. Accordingly, the rotation of the second intermediate shaft 81 transmitted from the output shaft 10 is put into a state of not being transmitted to the boss sleeve 98.

Therefore, turning the switch 13 ON by performing a push-in operation of the trigger 14 drives the motor 9 to cause the output shaft 10 to rotate. Then, the tool holder 23 rotates via the first intermediate shaft 80 to rotate the bit B on the distal end.

Next, the switching knob 116 is switched to the hammer drill mode. Then, the most retreated position of the first eccentric pin 118 is not changed, and the first plate 112 and the first clutch 88 remain in the retreated position.

Meanwhile, the second eccentric pin 119 retreats from the most advance position to the intermediate position, and the second clutch 104 comes to the retreated position together with the second plate 114. Accordingly, the rotation of the second intermediate shaft 81 is put into a state of being transmitted to the boss sleeve 98 via the second clutch 104.

Therefore, performing the push-in operation of the trigger 14 drives the motor 9, and the tool holder 23 rotates via the first intermediate shaft 80 to rotate the bit B on the distal end. Simultaneously, since the boss sleeve 98 rotates and the arm 100 swings back and forth, the piston cylinder 33 reciprocates. Accordingly, the striker 34 reciprocates and hammers the bit B via the impact bolt 35.

Next, the switching knob 116 is switched to the hammer mode (rotation lock). Then, the first eccentric pin 118 comes to the most advance position. The first clutch 88 comes to the advance position together with the first plate 112 to be engaged with the lock ring 91. Accordingly, the rotation of the first gear 84 is put into a state of not being transmitted to the first intermediate shaft 80, and the rotation of the tool holder 23 is locked together with the first intermediate shaft 80.

Meanwhile, the second eccentric pin 119 comes to the most retreated position, and the second clutch 104 remains in the retreated position. Accordingly, the rotation of the second intermediate shaft 81 is put into the state of being transmitted to the boss sleeve 98 via the second clutch 104.

Therefore, performing the push-in operation of the trigger 14 to drive the motor 9 causes the piston cylinder 33 to reciprocate in a state where the rotation of the tool holder 23 is locked and causes the bit B to be hammered by the striker 34 via the impact bolt 35.

When the first clutch 88 advances, the first clutch 88 is brought into contact with the rear faces of the stops 92 of the lock ring 91 and not engaged in a rotation direction in some cases. However, in this case, the lock ring 91 advances against the bias of the coil spring 93. Accordingly, when the first intermediate shaft 80 rotates by friction with the first gear 84 and the first clutch 88 rotates, the lock ring 91 retreats in an engaging phase to be engaged with the first clutch 88. Accordingly, the rotation of the first intermediate shaft 80 is locked.

Next, the switching knob 116 is switched to the hammer mode (neutral). Then, the first eccentric pin 118 retreats from the most advance position to the intermediate position. The first clutch 88 retreats together with the first plate 112 to be separated from the lock ring 91. However, the first clutch 88 comes to the intermediate position where the first clutch 88 is not engaged with the first gear 84. Accordingly, the rotation of the first gear 84 is put into a state of not being transmitted to the first intermediate shaft 80, and the tool holder 23 freely rotates together with the first intermediate shaft 80.

Meanwhile, the second eccentric pin 119 advances from the most retreated position to the intermediate position, and the second clutch 104 comes to the retreated position together with the second plate 114. Accordingly, the rotation of the second intermediate shaft 81 is transmitted to the boss sleeve 98 via the second clutch 104.

Therefore, performing the push-in operation of the trigger 14 to drive the motor 9 causes the piston cylinder 33 to reciprocate in a state where the tool holder 23 freely rotates and causes the bit B to be hammered by the striker 34 via the impact bolt 35.

Thus, when the hammer drill 1 is actuated in each operation mode, the fan 18 rotates by the rotation of the output shaft 10. Then, an outside air is suctioned from the air inlets 16 at the rear into the motor housing portion 7 of the motor housing 4 and moves forward to cool the motor 9. The cooling air flows into the connecting portion 6 and a part of the cooling air is discharged to the outside from the rear exhaust outlets 20. Another part of the cooling air moves forward inside the connecting portion 6 and passes through the gap S between the rear cylinder portion 22 and the front and rear flanges 59, 68 to flow into the rear cylinder portion 22. Then, the cooling air passes through outside space of the inner housing 40 and is discharged from the front exhaust outlets 58. At this time, the cooling air comes into contact with the front housing 41, thereby reducing a temperature rise of the front housing 41 due to heat generated at the driving mechanism 30. In particular, since the cooling air flows along the heat radiating fins 57, the heat in the front housing 41 is effectively radiated.

Meanwhile, the housing region T is filled with grease. In particular, since the front-side grease chamber 55 inside the front cylinder portion 21 is narrow space where useless space is eliminated by the partition wall 54, the filling rate of the grease inside the front-side grease chamber 55 increases. Accordingly, the grease scattered from the rotation/hammering actuation portion 31 becomes easy to reattach on the gear 38 and the like.

An effect of the disclosure according to the division of the inner housing is provided below.

The hammer drill 1 with the above-described configuration includes the housing 2 inside which the motor 9, the tubular tool holder 23, the driving mechanism 30, and the boss sleeve 98 (one example of a rotation conversion member) are disposed. The tubular tool holder 23 has a distal end and is rotatable with the bit B mounted on the distal end. The driving mechanism 30 is configured to perform at least one of the rotation actuation of the tool holder 23 and the hammering actuation of the bit B. The boss sleeve 98 is disposed in the driving mechanism 30 and is configured to convert the rotation of the output shaft 10 of the motor 9 to the hammering actuation of the bit B. The hammer drill 1 includes the inner housing 40 that supports the driving mechanism 30 while supporting the tool holder 23 via the bearing metal 46 (one example of a first bearing) and supporting the output shaft 10 via the bearing 66 (one example of a second bearing). Furthermore, the inner housing 40 is divided into the front housing 41 holding the bearing metal 46 and the rear housing 42 that is formed in a separate body from the front housing 41 and holds the bearing 66. The inner housing 40 is formed by connecting the front housing 41 to the rear housing 42 in the axis line direction of the tool holder 23. In the front housing 41, the O-ring 49 (one example of a seal member) sealing the outside space of the inner housing 40 inside the housing 2 is disposed.

With the configuration, since the inner housing 40 is divided into front and rear parts and the O-ring 49 is disposed in the front housing 41, the inner housing 40 in which the housing region T is decreased at the rear side of the O-ring 49 can be formed. Accordingly, downsizing of a product size is also achieved. Since the cooling air of the motor 9 can be guided to the outside of the inner housing 40, a preferred cooling effect of the driving mechanism 30 can be also obtained.

The boss sleeve 98 is housed inside the front housing 41. Accordingly, the heat generated by the actuation of the boss sleeve 98 can be effectively cooled via the front housing 41.

The O-ring 49 is arranged ahead of the boss sleeve 98. Accordingly, the outside space of the inner housing 40 where the cooling air flows can be formed to the outside of the boss sleeve 98 in the radial direction.

The O-ring 49 is positioned on the outside of the bearing metal 46 in the radial direction. Accordingly, the position of the O-ring 49 comes close to the frontmost of the inner housing 40 and the outside space can be widely ensured.

An air flow passage is formed on the outside of the boss sleeve 98 in the radial direction in the outside space. Accordingly, the heat transmitted from the boss sleeve 98 can be effectively cooled from the outside of the inner housing 40.

The front housing 41 is made of metal. Accordingly, the heat transmitted to the inner housing 40 can be effectively radiated.

The O-ring 75 (one example of a connecting surface seal member) is disposed on the connecting surface between the front housing 41 and the rear housing 42. Accordingly, sealing performance can be ensured even when the inner housing 40 is divided into two parts.

The driving mechanism 30 includes the first and second intermediate shafts 80, 81 parallel to the axis line direction of the tool holder 23. The first intermediate shaft 80 transmits the rotation of the output shaft 10 to the tool holder 23 while the second intermediate shaft 81 converts the rotation of the output shaft 10 to the hammering actuation of the bit B via the boss sleeve 98. Specifically, by assigning the first intermediate shaft 80 to transmit the rotation and assigning the second intermediate shaft 81 to transmit the hammering, the respective first and second intermediate shafts 80, 81 can be axially shortened. Accordingly, downsizing of the entire driving mechanism 30 is achieved.

The heat radiating fins 57 are formed on the outer surface of the front housing 41. Accordingly, the heat in the front housing 41 can be effectively radiated.

The motor 9 is arranged in a posture such that the output shaft 10 extends along the axis line direction of the tool holder 23, the fan 18 is disposed on the output shaft 10, the air inlets 16 are disposed on the rear side of the housing 2 and the front exhaust outlets 58 (one example of exhaust outlets) are disposed on the front side, and the air inlets 16 and the front exhaust outlets 58 are opposed to one another across the axis line direction of the output shaft 10. Accordingly, the inner housing 40 can be cooled in a well-balanced manner.

In the disclosure according to the division of the inner housing, the following modifications can be made.

As the seal member disposed in the front housing, a seal member other than an O-ring can be employed. A plurality of seal members may be disposed.

The front housing can be configured not to be made of metal in whole, but to be partially made of metal in a manner that, for example, only the holder of a bearing that supports the tool holder is made of metal, or the like. However, the front housing may be made of resin. The rear housing may also be made of metal.

Assembling of the front housing and the rear housing is also not limited to the structure of being sandwiched by an outer housing and a motor housing similarly to the above-described configuration. Screw stops and the like can be employed.

The structure of the air flow passage of the outside space of the front housing is not limited to the above-described configuration. The position and shape of the heat radiating fins is changeable. The heat radiating fins can be omitted.

The positions and numbers of air inlets and exhaust outlets may be changed appropriately. For example, the air inlets and the exhaust outlets can be reversely arranged in the front and rear to cool the inner housing before a motor.

One intermediate shaft may be configured instead of two.

An effect of the disclosure according to the partition wall dividing housing region is provided below.

The hammer drill 1 (one example of a hammering tool) with the above-described configuration includes the housing 2 inside which the motor 9, the tool holder 23, the driving mechanism 30, and the inner housing 40 are disposed. The tool holder 23 has the distal end on which the bit B is mountable. The driving mechanism 30 is configured to hammer the bit B, and the inner housing 40 supports the driving mechanism 30 inside the housing 2. In the hammer drill 1, space including the housing region T is formed inside the housing 2. The space including the housing region T is partitioned by the housing 2, the inner housing 40, and the O-ring 49 (one example of the seal member) interposed between the housing 2. Inside the housing 2, the partition wall 54 that divides the housing region T and space other than the housing region T is disposed.

With the configuration, the useless space can be eliminated by the partition wall 54 without using a separate guiding member and the like to decrease the housing region T. Accordingly, the manufacturing cost and the labor of assembling can be reduced while the filling rate of the grease can be increased.

The partition wall 54 is formed by bringing the outer-side rib 52 and the inner-side rib 50, which are respectively formed in the outer housing 3 (one example of a housing) and the inner housing 40, into contact with one another. Accordingly, the partition wall 54 is formed simultaneously with the assembling of the outer housing 3 and the inner housing 40, resulting in a rational structure.

The outer-side rib 52 (one example of a rib on the housing side) is a rib that is brought into close contact with the inner-side rib 50 (one example of a rib on the inner housing side) by being pressed against the inner-side rib 50 to be deformed. Accordingly, even though the outer-side rib 52 and the inner-side rib 50 are brought into close contact and the partition wall 54 is formed by the contact between the ribs, the sealing performance can be ensured.

The outer housing 3 is made of resin and the front housing 41 of the inner housing 40 is made of metal. Accordingly, the rigidity of the inner housing 40 is ensured while the tight contact between the outer-side rib 52 and the inner-side rib 50 can be maintained.

The motor 9 is arranged in a posture such that the output shaft 10 is parallel to the axis line direction of the tool holder 23, and the driving mechanism 30 includes the first intermediate shaft 80 that is arranged parallel to the tool holder 23 and to which the rotation of the output shaft 10 is transmitted. The first intermediate shaft 80 includes a gear 38 that transmits the rotation to the tool holder 23 and is supported by the inner housing 40, and the inner-side rib 50 is configured to cover a part of the gear 38. Accordingly, the partition wall 54 is formed on the outside of the gear 38 to make the grease easier to be reattached.

The inner housing 40 includes the bearing holder 43 that holds the bearing metal 46 supporting the tool holder 23, and the inner-side rib 50 is formed to project on the bearing holder 43. Accordingly, the inner-side rib 50 can be easily formed by using the bearing holder 43.

The front end of the inner-side rib 50 projects to the frontmost position of the inner housing 40. Accordingly, being butted together with the outer-side rib 52 becomes easy.

In the disclosure according to the partition wall dividing the housing region, the following modifications can be made.

The respective front-rear lengths of an inner-side rib and an outer-side rib are not limited to the above-described configuration. The front-rear lengths of the inner-side rib and the outer-side rib can be significantly different.

The formation of the partition wall is not limited to the contact between the ribs. Only on any one of the outer housing and the inner housing, a rib that is brought into contact with the surface of the other one may be formed.

The division shape by the partition wall is not limited to the above-described configuration. Without configuring a semicircular shape surrounding the tool holder and a gear, for example, the partition wall can be configured to be a planar shape extending in the right-left direction.

The position of the partition wall is not limited to the above-described configuration. In accordance with the shapes of the outer housing and the inner housing, the partition wall may be positioned on the upper side or the lower side with respect to the above-described configuration.

The disclosure is not limited to the application to a hammer drill. The disclosure can be applied to other hammering tools, such as an electric hammer.

As a hammering tool, the structure is not limited to the structure in which a piston cylinder is reciprocated by the intermediate shaft (one shaft may be acceptable) and the rotation conversion member. For example, a hammering tool in which a crank mechanism is employed and the piston cylinder is reciprocated by a connecting rod may be applied.

An effect of the disclosure according to assembling of the outer housing, the motor housing, and the inner housing is provided below.

The hammer drill 1 (one example of the hammering tool) with the above-described configuration includes the housing 2 inside which the motor 9, the tubular tool holder 23, the driving mechanism 30, and the inner housing 40 are disposed. The tubular tool holder 23 has the distal end on which the bit B is mountable. The driving mechanism 30 is configured to hammer the bit B, and the inner housing 40 supports the driving mechanism 30. The housing 2 includes the outer housing 3 on the front side and the motor housing 4 that is assembled to the rear side of the outer housing 3 and houses the motor 9. The outer housing 3, the motor housing 4, and the inner housing 40 are connected in the axis line direction of the tool holder 23. On the outer housing 3, the screw bosses 71 for screwing the outer housing 3 and the motor housing 4 are formed to project to the motor housing 4 side. The motor housing 4 and the inner housing 40 are engaged with the screw bosses 71 to be positioned.

With the configuration, since the outer housing 3 is not connected to the motor housing 4 in whole by inlaying and connecting, the arrangement of internal components and a design surface are less likely to be affected. Additionally, the motor housing 4 and the inner housing 40 can be easily positioned with respect to the outer housing 3 on which the screw bosses 71 are disposed. Accordingly, the outer housing 3, the motor housing 4, and the inner housing 40 can be accurately assembled while the freedom of design is ensured.

The screw bosses 71 are disposed at four positions. Accordingly, the positioning in the rotation direction can be surely performed.

The inner housing 40 is sandwiched between the outer housing 3 and the motor housing 4. Accordingly, the inner housing 40 can be positioned using the outer housing 3 and the motor housing 4.

The inner housing 40 is pressed from both front and rear faces by the outer housing 3 and the motor housing 4. Accordingly, the inner housing 40 can be strongly secured between the outer housing 3 and the motor housing 4.

The inner housing 40 is divided into two parts in the axis line direction of the tool holder 23. Accordingly, the rear housing 42 is configured to be made of resin, allowing for weight reduction.

The screw boss 71 has a cylindrical shape, and the engaging portion on the inner housing 40 with the screw boss 71 is the semicircular cutout 69. Accordingly, the positioning can be surely performed by engaging the cutouts 69 with the screw bosses 71.

The screw bosses 71 are formed on the outer housing 3 side and the female threaded portions 72 into which the screws 8 passing through the screw bosses 71 are screwed are formed on the motor housing 4. Accordingly, screwing from the front of the outer housing 3 can be easily performed.

The front housing 41 of the inner housing 40 is made of metal. Accordingly, the rigidity of the inner housing 40 can be ensured.

In the disclosure according to the assembling of the outer housing, the motor housing, and the inner housing, the following modifications can be made.

The screw boss may be disposed not on the outer housing but on the motor housing to screw from the rear of the motor housing. On the housing on the other side with which a screw boss is engaged, a shape other than a circular depressed portion may be formed.

The screw boss does not necessarily have a cylindrical shape. Accordingly, it is only necessary for the engaging portion disposed on the inner housing to be changed according to the outer shape of the screw boss without configuring a semicircular cutout.

The inner housing is not necessarily divided into two parts. On an integral inner housing, a sandwiched portion that is sandwiched between the outer housing and the motor housing may be formed.

The inner housing may be made of metal in whole or may be made of resin in whole.

It is only necessary for the number of screw bosses to be at least two positions as long as the positioning in the rotation direction of each housing can be made.

The disclosure is not limited to the application to a hammer drill. The disclosure can be applied to other hammering tools, such as an electric hammer.

As a hammering tool, the structure is not limited to the structure in which the piston cylinder is reciprocated by the intermediate shaft (one shaft may be acceptable) and the rotation conversion member. For example, a hammering tool in which a crank mechanism is employed and the piston cylinder is reciprocated by a connecting rod may be applied.

The following describes modification examples in common between the respective disclosures.

The direction of the motor is not limited to the front-rear direction and can be changed appropriately.

The motor is not limited to a motor with a brush, and a brushless motor can be employed.

The power supply may be a battery pack instead of a commercial power supply.

The selectable operation modes are not limited to four. The position of the switching knob can be also changed appropriately.

The hammering actuation may be performed by the structure in which not a piston cylinder, but a piston reciprocates inside a secured cylinder. The structure in which an impact bolt does not exist and a striker directly hammers the bit may be applied.

From the above-described configuration, the following other disclosures are extracted.

(Other Disclosure 1)

A hammering tool includes, inside a housing, a motor, a tubular tool holder having a distal end on which a bit can be mounted, a driving mechanism that can hammer the bit, and an inner housing that supports the driving mechanism.

The housing includes an outer housing on a front side and a motor housing that is assembled to a rear side of the outer housing and houses the motor, and the outer housing, the motor housing, and the inner housing are connected in an axis line direction of the tool holder.

Meanwhile, a screw boss for screwing the outer housing and the motor housing is formed on any one of the outer housing and the motor housing to project to another side, and the housing on the other side and the inner housing are engaged with the screw boss to be positioned.

(Other Disclosure 2)

In the hammering tool according to the other disclosure 1, the screw boss is disposed on at least two positions.

(Other Disclosure 3)

In the hammering tool according to the other disclosure 1 or 2, the inner housing is sandwiched between the outer housing and the motor housing.

(Other Disclosure 4)

In the hammering tool according to the other disclosure 3, the inner housing is pressed from both front and rear faces by the outer housing and the motor housing.

(Other Disclosure 5)

In the hammering tool according to any one of the other disclosures 1 to 4, the inner housing is divided into two parts in the axis line direction.

(Other Disclosure 6)

In the hammering tool according to any one of the other disclosures 1 to 5, the screw boss has a cylindrical shape, and an engaging portion in the inner housing with the screw boss is a semicircular cutout.

(Other Disclosure 7)

In the hammering tool according to any one of the other disclosures 1 to 6, the screw boss is formed on the outer housing side and a female threaded portion into which a screw passing through the screw boss is screwed is formed on the motor housing.

(Other Disclosure 8)

In the hammering tool according to the any one of other disclosures 1 to 7, at least a part of the inner housing is made of metal.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A hammering tool comprising:

a housing; and a motor, a tubular tool holder, a driving mechanism, and an inner housing inside the housing, wherein the tool holder has a front end on which a bit is mountable, the driving mechanism is configured to hammer the bit, the inner housing supports the driving mechanism, the housing includes an outer housing on a front side and a motor housing that is assembled to a rear side of the outer housing and houses the motor such that the motor is radially surrounded by the motor housing, the outer housing, the motor housing, and the inner housing are connected in an axis line direction of the tool holder, a screw boss for screwing the outer housing and the motor housing is formed on any one of the outer housing and the motor housing to project to another side, the housing on the other side and the inner housing are engaged with the screw boss to be positioned, the screw boss is formed on the outer housing side and a female threaded portion into which a screw passing through the screw boss is screwed is formed on the motor housing, a depressed portion to which the screw boss is fitted in a state of screwing the outer housing and the motor housing is formed on a front face of the female threaded portion, four screwing portions projecting out to four corners in a front view are formed on a rear end of the outer housing, and the screw boss projecting rearward is each disposed on a rear face of each of the screwing portions, and in the state of screwing the outer housing and the motor housing, rear end surfaces of the respective screwing portions and front end surfaces of the respective female threaded portions are not in contact.

2. The hammering tool according to claim 1, wherein the screw boss has a cylindrical exterior, and the inner housing has a semicircular cutout engaged with the cylindrical exterior.

3. The hammering tool according to claim 1, wherein the screw boss is disposed on at least two positions.

4. The hammering tool according to claim 1, wherein the inner housing is sandwiched between the outer housing and the motor housing.

5. The hammering tool according to claim 4, wherein the inner housing is pressed from both front and rear faces by the outer housing and the motor housing.

6. The hammering tool according to claim 1, wherein the inner housing is divided into two parts in the axis line direction.

7. The hammering tool according to claim 1, wherein the screw boss is formed on the outer housing side and a female threaded portion into which a screw passing through the screw boss is screwed is formed on the motor housing.

8. The hammering tool according to claim 7, wherein a depressed portion to which the screw boss is fitted in a state of screwing the outer housing and the motor housing is formed on a front face of the female threaded portion.

9. The hammering tool according to claim 8, wherein four screwing portions projecting out to four corners in a front view are formed on a rear end of the outer housing, and the screw boss projecting rearward is each disposed on a rear face of each of the screwing portions.

10. The hammering tool according to claim 9, wherein in the state of screwing the outer housing and the motor housing, rear end surfaces of the respective screwing portions and front end surfaces of the respective female threaded portions are not in contact.

11. The hammering tool according to claim 1, wherein at least a part of the inner housing is made of metal.

12. The hammering tool according to claim 11, wherein the part made of metal is disposed inside the outer housing, and a plurality of heat radiating fins are formed to project on an outer surface of the part.

13. The hammering tool according to claim 12, wherein a plurality of exhaust outlets is formed outside in a projection direction of the heat radiating fins and on side surfaces of the outer housing.

14. A hammering tool comprising:

a housing; and a motor, a tubular tool holder, a driving mechanism, and an inner housing inside the housing, wherein the tool holder has a front end on which a bit is mountable, the driving mechanism is configured to hammer the bit, the inner housing supports the driving mechanism, the housing includes an outer housing on a front side and a motor housing that is assembled to a rear side of the outer housing and houses the motor, wherein the motor housing forms an exterior surface of the hammering tool, the outer housing, the motor housing, and the inner housing are connected in an axis line direction of the tool holder, a screw boss for screwing the outer housing and the motor housing is formed on any one of the outer housing and the motor housing to project to another side, the housing on the other side and the inner housing are engaged with the screw boss to be positioned, the screw boss is formed on the outer housing side and a female threaded portion into which a screw passing through the screw boss is screwed is formed on the motor housing, a depressed portion to which the screw boss is fitted in a state of screwing the outer housing and the motor housing is formed on a front face of the female threaded portion, four screwing portions projecting out to four corners in a front view are formed on a rear end of the outer housing, and the screw boss projecting rearward is each disposed on a rear face of each of the screwing portions, and in the state of screwing the outer housing and the motor housing, rear end surfaces of the respective screwing portions and front end surfaces of the respective female threaded portions are not in contact.

* * * * *